US012634679B2

(12) United States Patent
Hong

(10) Patent No.: US 12,634,679 B2
(45) Date of Patent: May 19, 2026

(54) METHOD FOR PERFORMING COMMUNICATION USING MULTIPLE USIMs AND DEVICE THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 492 days.

(21) Appl. No.: 17/796,001

(22) PCT Filed: Jan. 13, 2021

(86) PCT No.: PCT/KR2021/000431
§ 371 (c)(1),
(2) Date: Jul. 28, 2022

(87) PCT Pub. No.: WO2021/153927
PCT Pub. Date: Aug. 5, 2021

(65) Prior Publication Data
US 2023/0080113 A1 Mar. 16, 2023

(30) Foreign Application Priority Data

| | | |
|---|---|---|
| Jan. 31, 2020 | (KR) | 10-2020-0012201 |
| Jan. 7, 2021 | (KR) | 10-2021-0001739 |

(51) Int. Cl.
| | |
|---|---|
| *H04W 8/22* | (2009.01) |
| *H04W 24/08* | (2009.01) |
| *H04W 68/02* | (2009.01) |

(52) U.S. Cl.
CPC ............. *H04W 8/22* (2013.01); *H04W 24/08* (2013.01); *H04W 68/02* (2013.01)

(58) Field of Classification Search
CPC ....... H04W 68/02; H04W 76/34; H04W 8/22; H04W 8/183; H04W 24/08; H04W 88/06; H04W 68/00; H04W 60/005
See application file for complete search history.

(56) References Cited

U.S. PATENT DOCUMENTS

| | | | |
|---|---|---|---|
| 2013/0150018 A1 | 6/2013 | Su et al. | |
| 2013/0303203 A1 | 11/2013 | Wang et al. | |
| 2014/0073312 A1 | 3/2014 | Su et al. | |
| 2014/0128082 A1 | 5/2014 | Chirayil | |
| 2016/0219648 A1* | 7/2016 | Awoniyi-Oteri | ........ H04W 8/24 |

(Continued)

OTHER PUBLICATIONS

European Patent Office, Extended European Search Report of corresponding EP Patent Application No. 21747746.2, Jan. 30, 2024.

(Continued)

*Primary Examiner* — Mahran Y Abu Roumi
(74) *Attorney, Agent, or Firm* — IP Legal Services, LLC

(57) ABSTRACT

Provided are a method and a device for performing communication by a UE with multiple USIMs that are in operation at the same time. The method may include determining, in a state of concurrent registration to one or more networks associated with multiple USIMs, release of one or more networks in a connected state, transmitting assistance information for instructing release to a base station or a core network control plane entity, and monitoring a paging message based on the assistance information.

11 Claims, 13 Drawing Sheets

(56) References Cited

U.S. PATENT DOCUMENTS

2017/0150545 A1*    5/2017   Ramkumar ........... H04W 8/082
2017/0325278 A1    11/2017   Ramkumar et al.
2018/0359669 A1*   12/2018   Fujishiro .............. H04W 52/02
2019/0261287 A1     8/2019   Deenoo et al.
2021/0076335 A1     3/2021   Deenoo et al.
2022/0015038 A1*    1/2022   Shi ........................ H04W 76/10
2023/0110121 A1     4/2023   Deenoo et al.

OTHER PUBLICATIONS

Qualcomm Incorporated et al., "Solution for paging collision avoid-
ance", S2-2000116, 3GPP TSG SA WG2 Meeting #136AH, Jan.
13-17, 2020, Incheon, Korea, pp. 1-6.
Vivo, "Report of phase 1 Multi-SIM email discussion", RP-191898,
3GPP TSG-RAN WG Meeting #85, Newport Beach, USA, Sep.
16-20, 2019.
LG Electronics Inc., "Assistance Information for Temporary Capa-
bility Restriction", R2-1705275, 3GPP TSG-RAN WG2 Meeting
98, Hangzhou, China, May 15-19, 2017, pp. 1-3.

* cited by examiner frequency

Switch of active bandwidth part time

METHOD FOR PERFORMING COMMUNICATION USING MULTIPLE USIMs AND DEVICE THEREFOR

CROSS REFERENCE TO RELATED APPLICATIONS

This application is a National Stage Patent Application of PCT International Patent Application No. PCT/KR2021/000431 (filed on Jan. 13, 2021) under 35 U.S.C. § 371, which claims priority to Korean Patent Application Nos. 10-2020-0012201 (filed on Jan. 31, 2020) and 10-2021-0001739 (filed on Jan. 7, 2021), the teachings of which are incorporated herein in their entireties by reference.

TECHNICAL FIELD

The disclosure relates to a method and device for a user equipment (UE) having a plurality of universal subscriber identity modules (USIMs) (e.g., UE with multiple USIMs that are in operation at the same time) to perform communication.

BACKGROUND ART

A user may use one user equipment (UE) with two or more universal subscriber identity modules (USIMs). Each of the USIMs may be configured to use a dedicated network operated by one operator. Or, each USIM may be configured to use one of different services provided by one operator.

Further, a user may use one UE with two or more USIMs to simultaneously or sequentially transmit/receive data according to various communication environments and UE characteristics.

As described, a plurality of USIMs may be configured and used in a single UE for various purposes.

However, because two or more USIMs are used in single UE, the UE's paging occasions may overlap, or the UE's state may be set differently to each USIM. Further, data transmissions/receptions may overlap, or specific events may occur at the same time.

Accordingly, data service may be interrupted or limited. Further, a specific procedure may be required to handle operations when the respective radio resource control (RRC) connected states of two or more USIMs are varied differently to each other.

As described, there is a chance of failing to seamlessly provide a related service due to various overlapping situations and status changes when a single UE is used with a plurality of USIMs.

DETAILED DESCRIPTION OF THE INVENTION

Technical Problem

The disclosure provides a method and device for seamlessly providing a communication service even when two or more USIMs are configured (e.g., equipped, installed, used) in a UE.

Technical Solution

In an aspect, the disclosure provides a method for performing communication using a plurality of USIMs by a UE. The method may include determining release one or more networks in a connected state while in concurrent registration to the one or more networks associated with the plurality of USIMs, transmitting assistance information for instructing the release to a base station or a core network control plane entity and monitoring a paging message based on the assistance information.

In another aspect, the disclosure provides a method for performing communication with a UE using a plurality of USIMs by a base station. The method may include receiving, from a core network control plane entity, assistance information for instructing to release connection, transmitted from the UE in concurrent registration to one or more networks associated with the plurality of USIMs and controlling transmission of a paging message for the UE based on the assistance information.

In another aspect, the disclosure provides a UE performing communication using a plurality of USIMs. The UE may include a controller for determining release for one or more networks in a connected state while in concurrent registration to the one or more networks associated with the plurality of USIMs and a transmitter for transmitting assistance information for instructing the release to a base station or a core network control plane entity, wherein the controller monitors a paging message based on the assistance information.

In another aspect, the disclosure provides a base station performing communication with a UE using a plurality of USIMs. The base station may include a receiver for receiving, from a core network control plane entity, assistance information for instructing to release connection, transmitted from a UE in concurrent registration to one or more networks associated with the plurality of USIMs and a controller for controlling transmission of a paging message to the UE based on the assistance information.

Advantageous Effects

According to embodiments of the disclosure, a communication service may be seamlessly provided even when two or more USIMs are configured in a UE.

BRIEF DESCRIPTION OF DRAWINGS

The above and other aspects, features, and advantages of the present disclosure will be more apparent from the following detailed description taken in conjunction with the accompanying drawings, in which.

MODE FOR CARRYING OUT THE INVENTION

Figure 1:
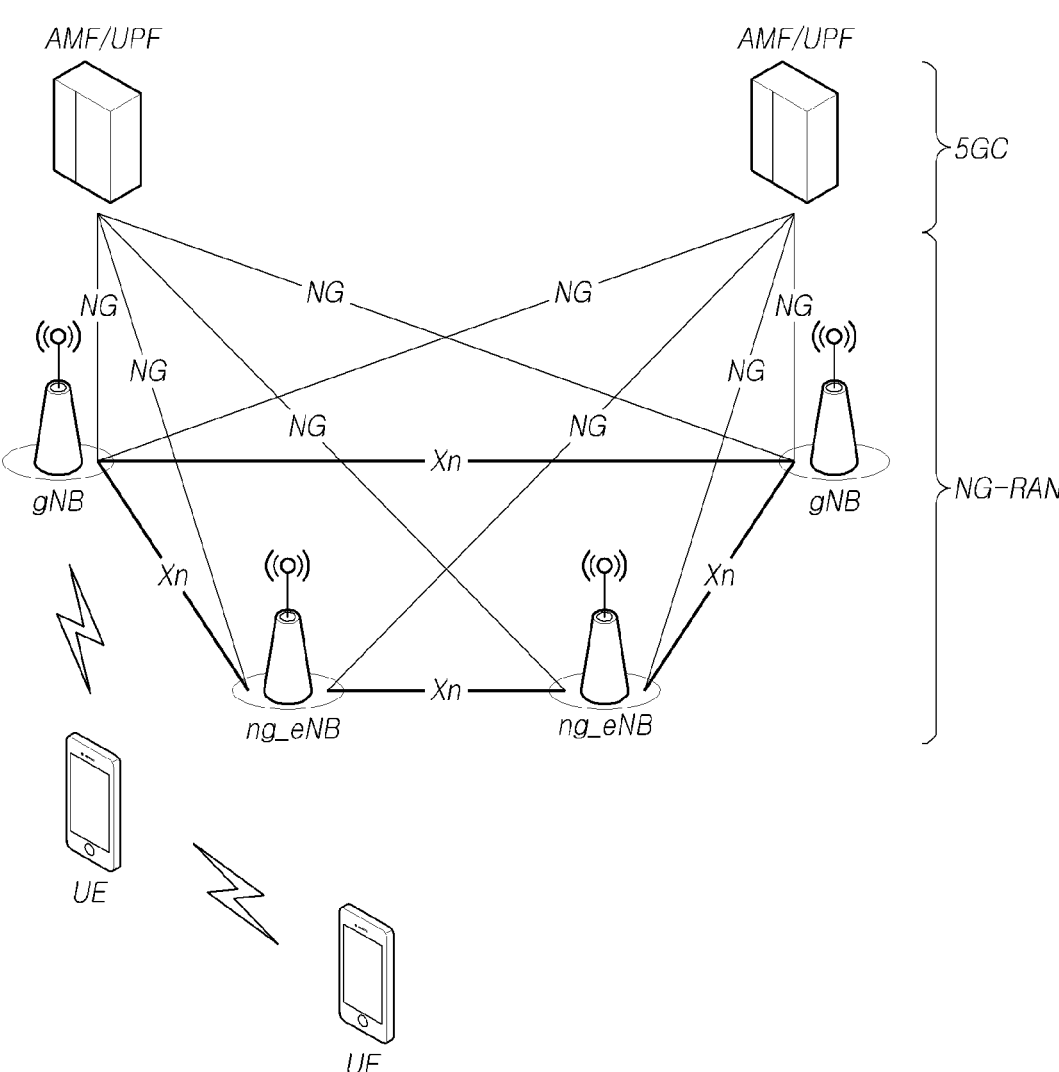
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
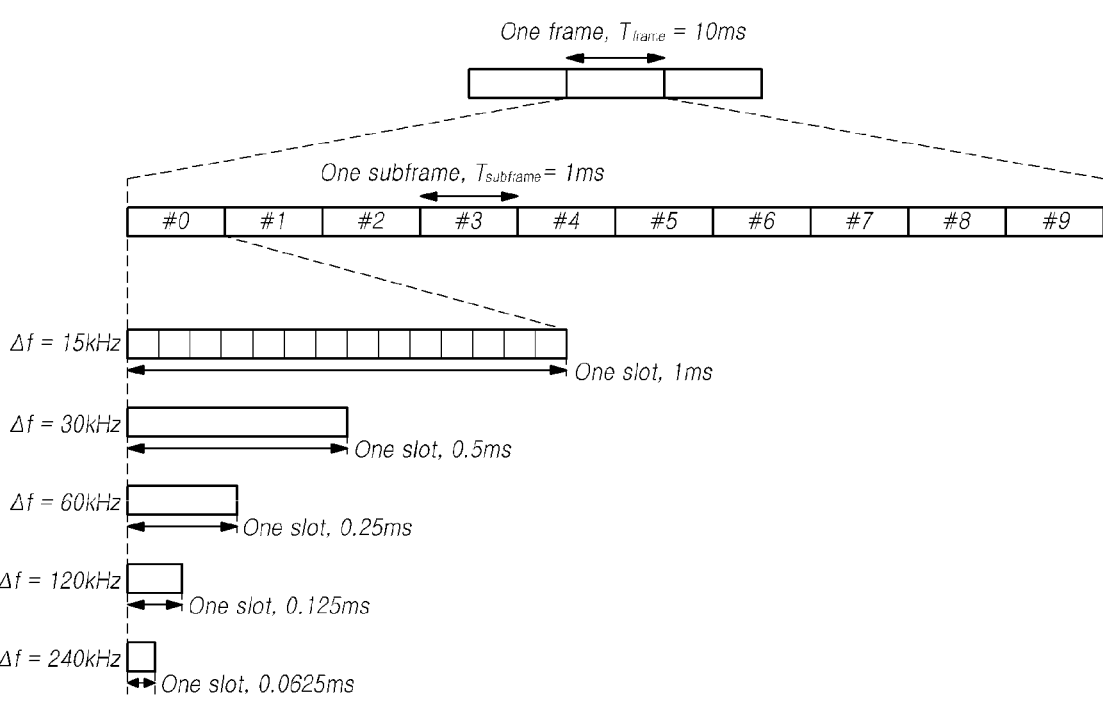
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
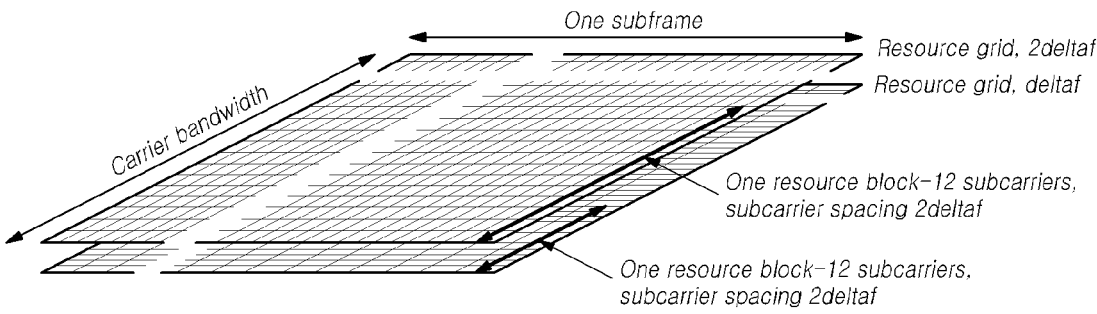
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
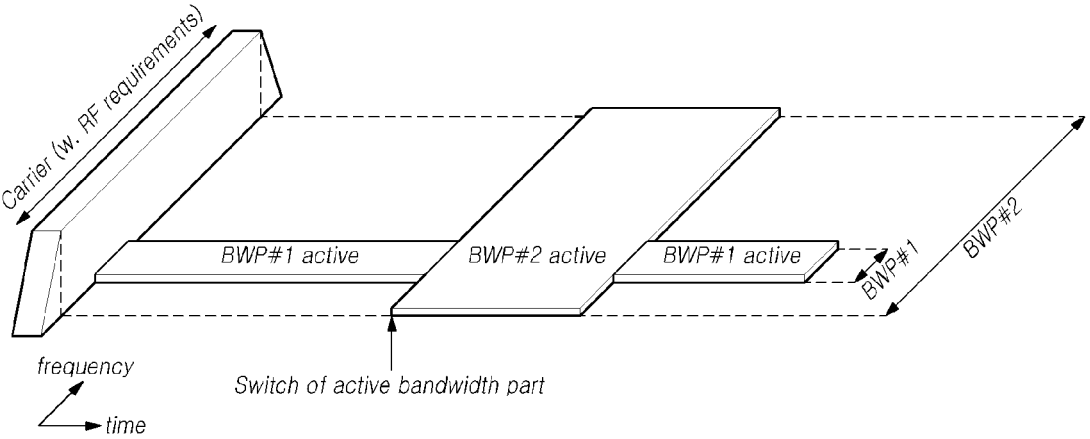
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
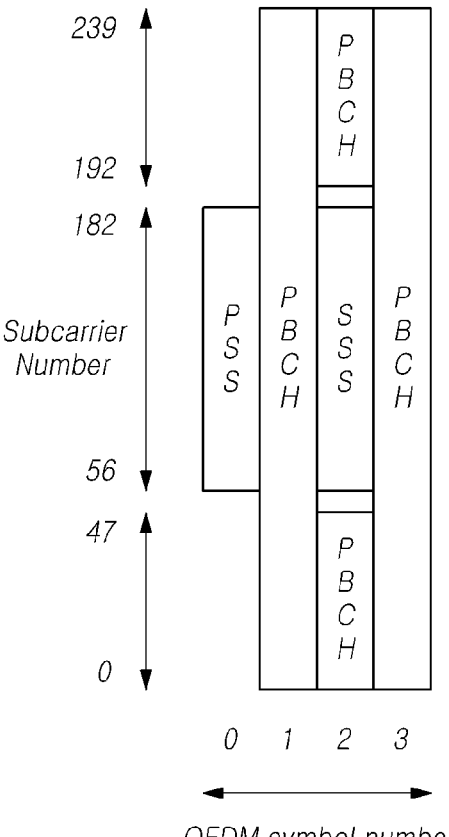
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORE-SET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
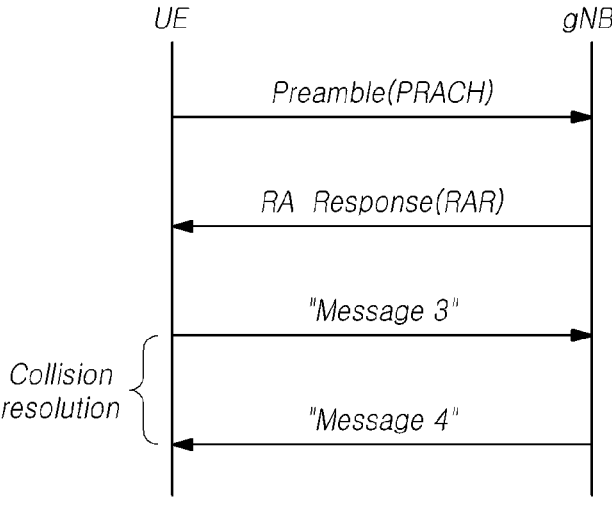
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
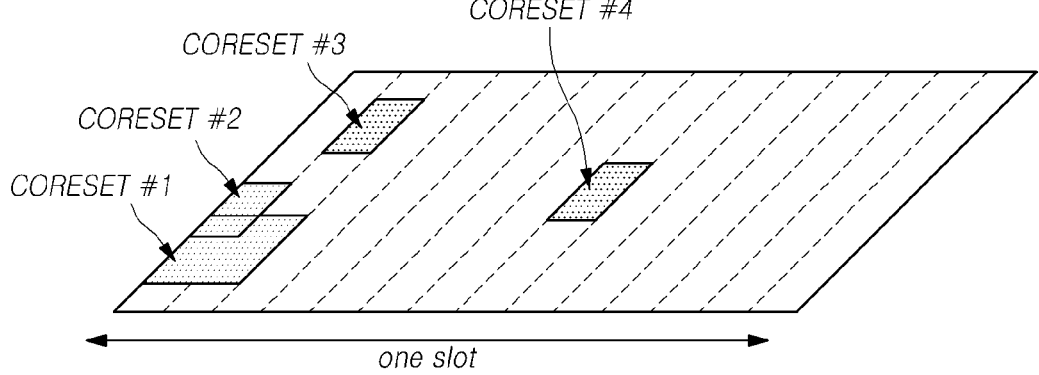
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

3GPP introduced NR, a next-generation wireless communication technology. That is, NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. The frame structure of the NR supports a frame structure based on multiple sub-carriers. The basic subcarrier spacing (SCS) is 15 kHz, and a total of 5 SCS types are supported at 15 kHz*2^n.

Figure 8:
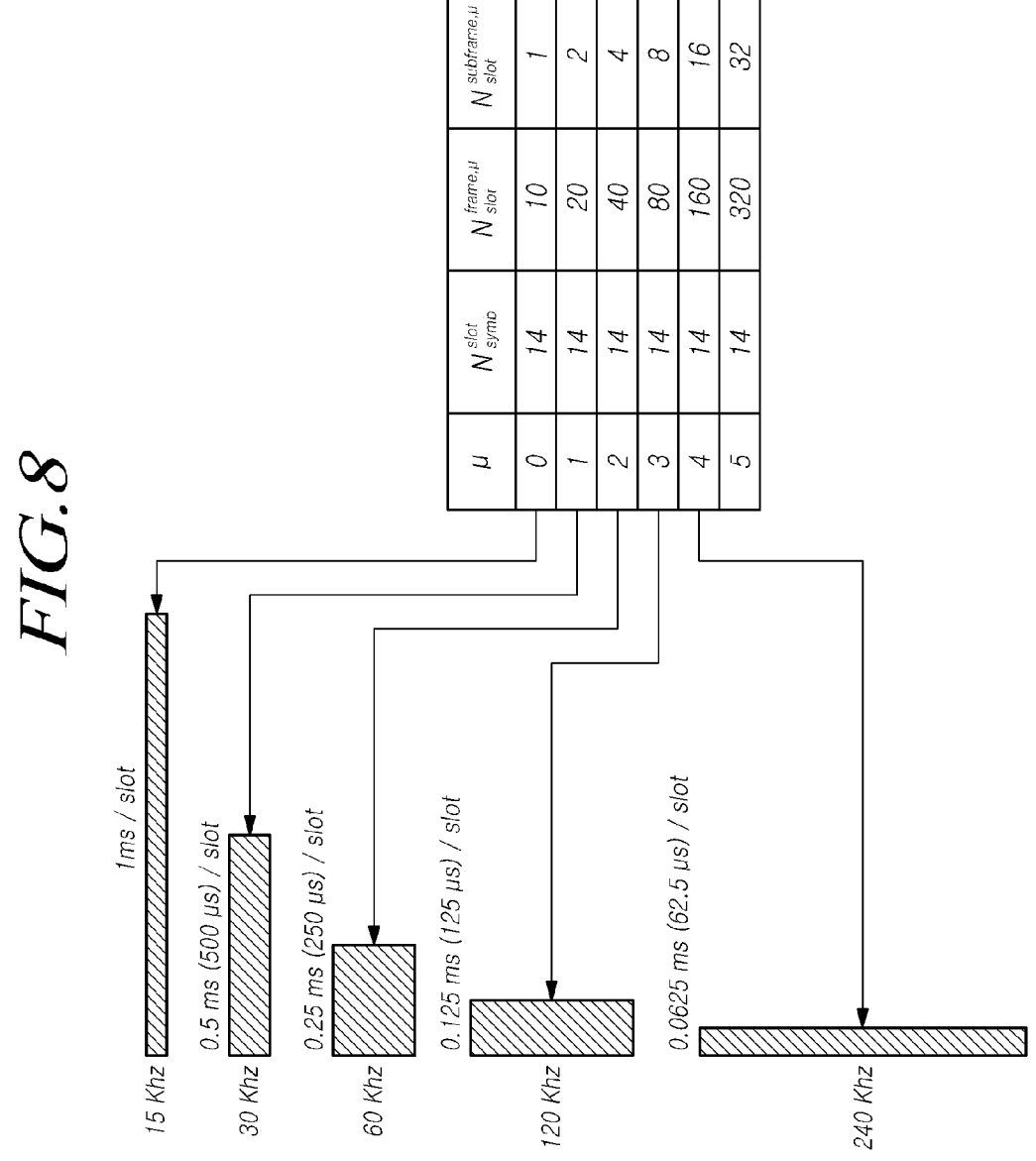
FIG. 8 is a view illustrating different subcarrier spacings arranged at a symbol level.

FIG. 8 is a view illustrating different subcarrier spacings arranged at a symbol level.

Referring to FIG. 8, the length of the slot in the time axis varies depending on the numerology. That is, the shorter the slot length, the larger the SCS. In this case, the number (y value) of OFDM symbols constituting a corresponding slot is determined to be 14 (e.g., y=14) regardless of the SCS value in the case of normal CP. Therefore, one slot is made up of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be configured, or a long-length time-domain scheduling interval for uplink/ downlink data transmission/reception may be configured via slot aggregation. In particular, in the case of transmission and reception of latency-sensitive data, such as URLLC, it is difficult to satisfy the latency requirements if scheduling is performed in slot units which are based on 1ms (14 symbols) as defined in the numerology-based frame structure which has a small SCS value, e.g., 15 kHz. Thus, a mini-slot is defined to be constituted of a smaller number of OFDM symbols than the slot constituted of 14 symbols. Based thereupon, scheduling capable of meeting the URLLC requirements may be carried out.

Figure 9:
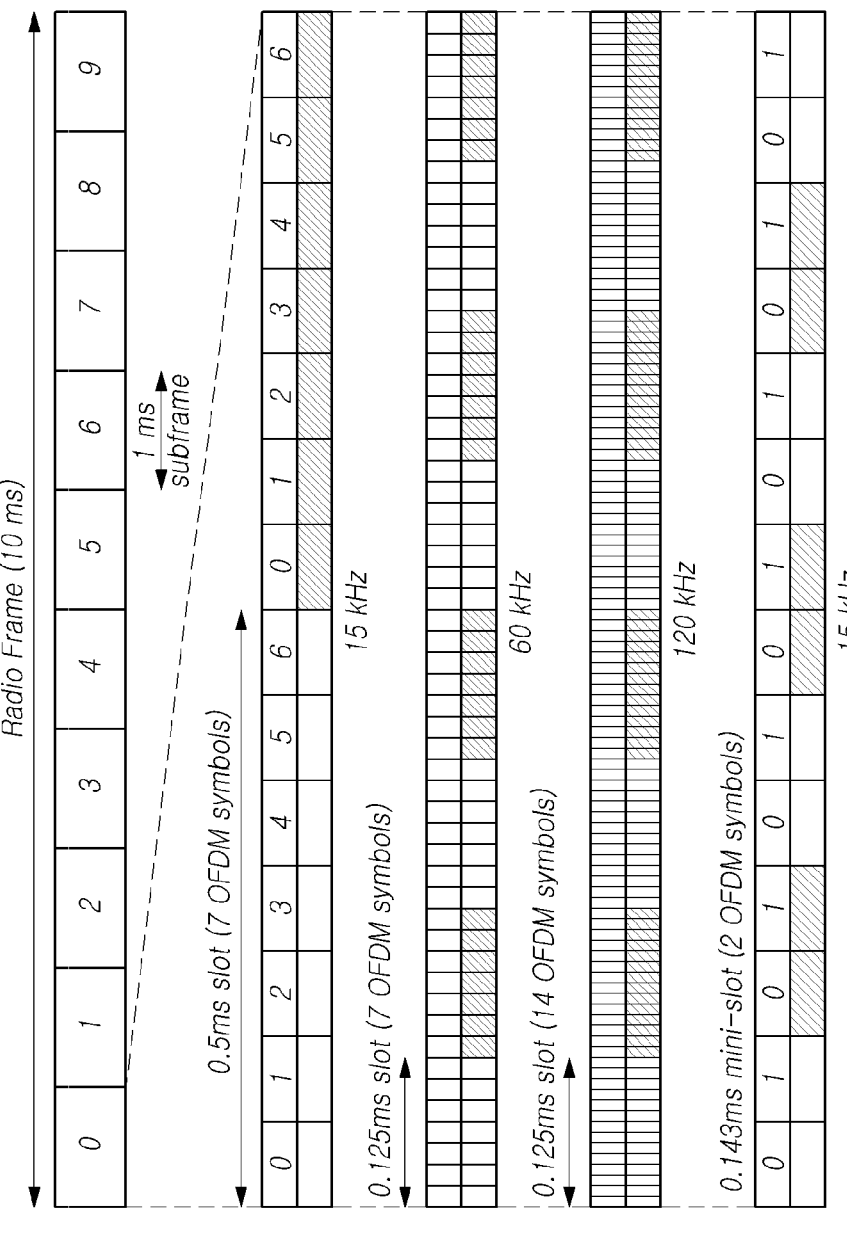
FIG. 9 is a view illustrating for explaining a time domain structure in a next-generation wireless communication system.

FIG. 9 is a view illustrating for explaining a time domain structure in a next-generation wireless communication system Referring to FIG. 9, NR supports the following structure on the time axis. Unlike LTE, the basic scheduling unit is changed to the above described slot in NR. Also, regardless of the subcarrier spacing, a slot made up of 14 OFDM symbols. On the other hand, it supports a non-slot structure (mini-slot structure) composed of 2, 4, and 7 OFDM symbols, which are smaller scheduling units. The non-slot structure may be used as a scheduling unit for URLLC service.

Radio frame: Fixed 10 ms regardless of the numerology.

Subframe: Fixed 1ms as a reference for time duration. It is not used for data/control scheduling unit, different from the LTE.

Slot: Mainly used for eMBB. It includes 14 OFDM symbols.

Non-slot (i.e. mini-slot): Mainly used for URLLC, but not limited to URLLC only. It includes 2, 4, or 7 OFDM symbols.

One TTI duration: A Time duration for data/control channel transmission. The number of OFDM symbols per a slot/non-slot in the time main.

NR Paging Procedure

Paging technology is used i) to attempt call reception to an RRC IDLE UE or RRC INACTIVE UE, ii) to instruct an RRC IDLE UE, RRC INACTIVE UE, or RRC CONNECTED UE, or iii) to change system information or provide the UE with an ETWS/CMAS (Earthquake and Tsunami Warning System/Commercial Mobile Alert System) indication. For example, the RRC IDLE UE monitors a paging channel for core network-initiated (CN-initiated) paging, and the RRC INACTIVE UE monitors a paging channel for RAN-initiated paging. Paging DRX is defined to reduce power consumption of the RRC IDLE UE or RRC INACTIVE UE. The paging DRX cycle may be configured by the network as follows.

For CN-initiated paging, a default cycle is broadcast in system information.

For CN-initiated paging, a UE specific cycle may be configured via NAS signaling.

For RAN-initiated paging, a UE-specific cycle may be configured via RRC signaling.

The UE uses the shortest of the DRX cycles applicable. For example, the RRC

IDLE UE uses the shortest of a default cycle for core network initiated paging and a UE-specific cycle. Similarly, the RRC INACTIVE UE uses the shortest of the above two cycles for core network initiated paging and one cycle for RAN initiated paging.

Meanwhile, the UE monitors one paging occasion (PO) per DRX cycle. A PO is a set of PDCCH monitoring occasions and can consist of multiple time slots (e.g., subframe or OFDM symbol) where paging DCI can be sent. One Paging Frame (PF) is one Radio Frame and may contain one or multiple PO(s) or starting point of a PO.

In multi-beam operations, the UE assumes that the same paging message and the same Short Message are repeated in all transmitted beams. Thus, the selection of the beam(s) for the reception of the paging message and Short Message is up to UE implementation. The paging message is same for both RAN initiated paging and CN initiated paging. The UE initiates RRC Connection Resume procedure upon receiving RAN initiated paging. If the UE receives a CN initiated paging in RRC_INACTIVE state, the UE moves to RRC_IDLE and informs NAS.

The PF and PO are determined by the following formula.

The system frame number (SFN) for the PF is determined by the following equation.

$$(SFN+PF\_offset)\bmod T=(T\ div\ N)*(UE\_ID\ \bmod\ N)$$

Further, Index (i_s) indicating the index of the paging occasion PO is determined by the following equation.

$$i\_s=floor(UE\_ID/N)\bmod Ns$$

The PDCCH monitoring occasion for paging is determined according to the parameters if the 'paging-SearchSpace' and 'firstPDCCH-MonitoringOccasionOfPO' parameters are configured.

When SearchSpaceId=0 is configured for paging-SearchSpace, the PDCCH monitoring occasions for paging are same as for RMSI as defined in clause 13 in TS 38.213.

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for paging-SearchSpace, the UE monitors the $(i\_s \ 1)^{th}$ PO, and a PO is a set of 'S' contiguous PDCCH monitoring occasions where 'S' is the number of actual transmitted SSBs determined according to ssb-PositionsInBurst in SIB1. The $K^{th}$ PDCCH monitoring occasion for paging in the PO corresponds to the $K^{th}$ transmitted SSB. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s \ 1)^{th}$ PO is the $(i\_s \ 1)^{th}$ value of the firstPDCCH-MonitoringOccasionOfPO parameter, otherwise, it is equal to i_s*S.

A PO associated with a PF may start in the PF or after the PF.

The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used in the calculation of PF and i_s above.

T: DRX cycle of the UE. (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPaging-FrameOffset as defined in TS 38.331 [3]. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string as defined in TS 23.501. 5G-S-TMSI shall in the formulae above be interpreted as a binary number where the left most bit represents the most significant bit.

Multi-USIM UE

A user may have multiple subscriptions with one UE. For example, the user may have one personal subscription and one enterprise subscription with one UE. Alternatively, the user may have two personal subscriptions with one UE.

Meanwhile, one USIM may be associated (e.g., assigned, equipped) per each subscription. For convenience of description, a UE having (e.g., equipped with) two or more USIMs is referred to as a multi-USIM UE. This is for convenience of description and may include a dual-USIM UE having two subscriptions and may be used interchangeably with any other term. Further, for convenience of description, hereinafter, a UE may mean a multi-USIM UE.

Currently, standard specifications are not defined for supporting multi-USIM UE. Accordingly, a UE registered in one or more networks needs to receive paging from one or more networks. However, when the UE's paging occasions overlap or while the UE is transmitting/receiving data in an active state (e.g., RRC connected) through one network, the UE may fail to receive paging through another network. Accordingly, while the UE is transmitting and receiving data in the active state (e.g., RRC connected) through one network, an important mobile terminated service may not be provided through another network. Further, if the multi-USIM UE simultaneously transmits and receives data in association with the USIMs, the multi-USIM UE may fail to process them. Accordingly, the service may be interrupted. In particular, when handover occurs in association with one USIM as the UE moves, performance may be degraded due to service interruption.

In order to overcome shortcomings described above, the disclosure provides a method and device for preventing service issues when a plurality of USIMs are configured in a UE.

According to an embodiment, the disclosure proposes a method and device for a multi-USIM UE transmitting/receiving data in an active state through a network associated with one USIM to effectively receive paging through another network associated with another USIM to provide a mobile terminated service. According to another embodiment, the disclosure proposes a method and device for reducing service interruption when a UE moves or collision occurs on transmission/reception by the associated USIMs. According to still another embodiment, the disclosure proposes a method and device for providing a switching operation between different USIMs.

For convenience of description, the following description is made based on NR, as the radio access technology. However, this is only for convenience of description, and embodiments may be applied to LTE or any radio access technology. Meanwhile, although the disclosure is described as applied to a licensed band, it may be likewise applied to any radio access technology using an unlicensed band. In the disclosure, for convenience of description, well-known information or technology is omitted from the description, and each embodiment may include the content of information elements and procedures specified in TS 38.331, a 3GPP NR RRC standard. Although no definitions of corresponding information elements or no details of the relevant procedures are included in the disclosure, the details or content specified in the standards may be used in association with the embodiments or encompassed in the scope of the disclosure.

The universal subscriber identity module (USIM) in the embodiments may be a physical SIM or an embedded-SIM (eSIM). A plurality of USIMs associated with a UE may belong to the same operator or different operators.

First, a scenario to which the disclosure may be applied will be described. Hereinafter, for convenience of description, a scenario will be described based on a multi-USIM UE having two subscriptions. This is merely for convenience of description, and the present embodiment may be applied to any scenario including a UE using two or more multiple USIMs.

A multi-USIM UE may denote a UE with multiple USIMs that are in operation at the same time. The user may have subscriptions respectively associated with to two LTE radio networks operated by different operators through one UE. The user may have subscriptions respectively associated with two LTE radio networks operated by one operator through one UE. The user may have subscriptions respectively associated with two NR radio networks operated by different operators through one UE. The user may have subscriptions respectively associated with two NR radio networks operated by one operator through one UE. The user may have subscriptions respectively associated with an LTE radio network and an NR radio network, operated by different operators through one UE. The user may have subscriptions associated with an LTE radio network and an NR radio network, respectively, operated by one operator through one UE. Two radio networks associated with the multi-USIM UE may be associated with different core networks, respectively. The core networks may be 5G system (5GS) or evolved packet system (EPS). The user may have subscriptions associated with to two core networks operated by different operators through one UE. When different operators associated with multiple USIMs share/ slice/roam one radio network, the multi-USIM UE may receive services through two different core networks connected to one radio network. In this case, the shared/sliced/ roamed radio network may be LTE or NR.

Each network associated with its respective USIM may process operations to independently perform registration procedures from another USIMs of the multi-USIM UE. Both the USIMs of the UE may be associated with their respective 5GS-based core networks. In this case, the radio network may generally assume NR application. However, NR or LTE may be used, respectively. Both the USIMs in one UE may be associated with their respective EPS-based core networks. In this case, the radio network assumes NR application, but NR or LTE may be used, respectively. In one UE, one USIM may be associated with the EPS-based core network and the other USIM may be associated with the 5GS-based core network. Even when the two USIMs are associated with one shared/sliced/roaming radio network, the radio network assumes NR application, but LTE may be used.

For example, the multi-USIM UE may be a UE capable of dual-reception/dual-transmission (Dual Rx/Dual Tx UEs). In this case, the UE may simultaneously transmit and receive data through the networks respectively associated with two USIMs through two receivers and two transmitters. As another example, the multi-USIM UE may be a dual-reception/single-transmission UE (Dual Rx/Single Tx UEs). Alternatively, the multi-USIM UE may be a single-reception/single-transmission UE (Single Rx/Single Tx UEs). When the multi-USIM UE has only one transmitter, it cannot simultaneously transmit data through the networks associated with the USIMs. Or, when the multi-USIM UE has only one receiver, it cannot simultaneously receive data through the networks associated with the USIMs.

Hereinafter, it is assumed that, by default, the multi-USIM UE is a single-reception/single-transmission UE (Single Rx/Single Tx UEs) or a dual-reception/single-transmission UE (Dual Rx/Single Tx UEs). If the corresponding UE transmits/receives data in the state connected to the network associated with one USIM, although receiving a paging message from the network associated with the other USIM, it is difficult to simultaneously establish connections to two networks to transmit/receive data even. If the UE releases the connection with the base station (for convenience of description, referred to as base station A) associated with one USIM, with which data transmission/reception is performed, in a locally already connected state and establishes a connection with another base station (for convenience of description, referred to as base station B) associated with the other USIM to transmit/receive data, base station A may unnecessarily waste radio resources to continue data transmission/reception. Further, to release the connection with base station B and resume connection with base station A, initial access signaling with the core network needs to be performed again, increasing signaling loads.

The multi-USIM UE may perform a network registration procedure/RRC connection setup procedure in association with each USIM to transmit/receive data or receive paging to transmit/receive data. Further, the multi-USIM UE may periodically perform tracking area update (TAU) or RAN-based notification area updates (RNAU). When all USIMs owned by the multi-USIM UE are in the RRC inactive/idle state, data transmission/reception may be triggered in connection with each USIM at the same time. When in the multi-USIM UE, one USIM is in the RRC inactive/idle state and the other USIM is in the RRC connected state, data transmission/reception may be triggered simultaneously in connection with each USIM. When the multi-USIM UE has collision in transmission/reception due to the associated USIMs, the following methods may be used individually or in any combination.

Figure 10:
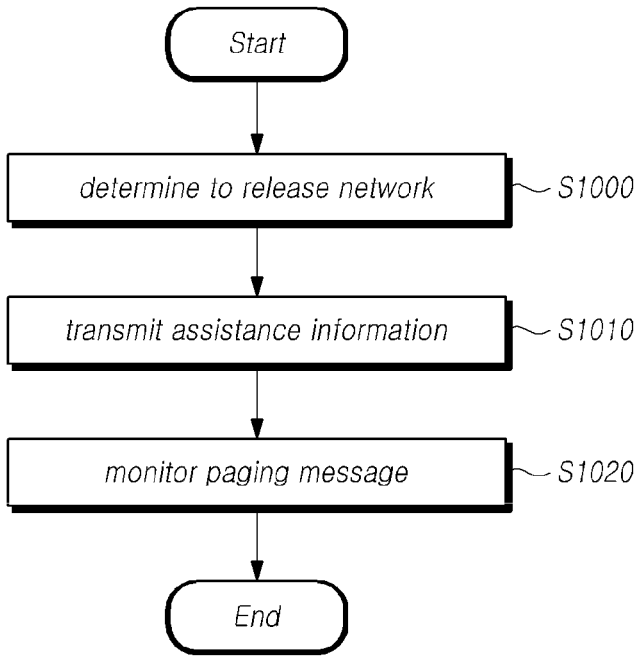
FIG. 10 is a flowchart for describing operations of a UE according to an embodiment.

FIG. 10 is a flowchart for describing operations of a UE according to an embodiment.

Referring to FIG. 10, a UE performing communication through a plurality of USIMs may perform the step of determining to release one or more connected networks, while being in concurrent registration in one or more networks associated with the plurality of USIMs (S1000).

According to an embodiment, the UE performing communication using the plurality of USIMs may concurrently register in one or more networks associated with the plurality of USIMs. The UE may determine to release one or more networks associated with the plurality of USIMs according to certain conditions. According to an embodiment, the UE may release the connection with the network associated with any one USIM according to a user input signal. Alternatively, the UE may determine to release the network associated with a specific USIM according to a priority or whether a preset condition is met.

The UE may perform the step of transmitting assistance information for instructing release to the base station or the core network control plane entity (S1010).

According to an embodiment, the assistance information may be included and transmitted in a NAS transport message or a non-assess stratum (NAS) deregistration message. Further, the assistance information may include information for limiting or allowing the transmission, by the base station or the core network control plane entity, of the paging message to the UE for a predetermined time preset.

According to an embodiment, the information for limiting or allowing paging message transmission may include at least one piece of i) information for instructing that only voice data be paged, ii) information for instructing paging restriction, iii) radio bearer information for limiting or allowing paging, iv) logical channel identification information (LCID), v) a flow identification number, vi) QoS flow ID (QFI) information, and vii) PDU session identification information.

Meanwhile, before the UE determines to release, the UE may receive indication information indicating whether the transmission of assistance information is allowed from the base station or the core network control plane entity (e.g., AMF). The UE may transmit the assistance information only when the transmission of the assistance information is allowed by the indication information.

The UE may perform the step of monitoring the paging message based on the assistance information (S1020).

According to an embodiment, when transmission of a paging message is restricted based on the assistance information, the UE may monitor the paging message considering the restriction. Alternatively, when the transmission of the paging message is allowed based on the assistance information, the UE may monitor the paging message considering the corresponding matter.

Alternatively, the UE may monitor a paging message in a specific paging occasion or paging frame determined based on the assistance information.

Meanwhile, the UE may not accept the paging message reception even when the paging message is identified as a result of monitoring the paging message. If the UE does not accept the reception of the paging message, the UE may transmit non-acceptance indication information about the paging message to the base station or the core network control plane entity.

Whether the UE accepts the reception of the paging message may be determined according to the cause of the paging. For example, the paging message may include paging cause information. The UE may determine whether to accept the reception of the paging message based on the paging cause information.

According to an embodiment, the paging cause information may include information indicating voice data. For example, when the paging cause information indicates voice data, the UE may receive a paging message and, otherwise, may not accept reception.

In addition to this, the UE may perform individual embodiments for the paging operation, service interruption reduction operation, and transmission/reception collision operation described below in any combination. A specific, specific embodiment for each UE operation is described in more detail below.

Figure 11:
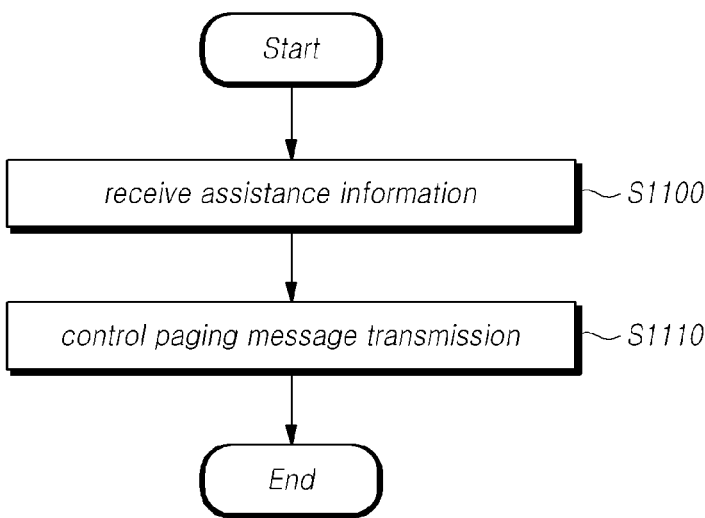
FIG. 11 is a flowchart for describing operations of a base station according to an embodiment.

FIG. 11 is a flowchart for describing operations of a base station according to an embodiment.

Referring to FIG. 11, a base station performing communication with a UE having a plurality of USIMs may perform the step of receiving, from the core network control plane entity, assistance information for instructing to release connection, transmitted from the UE in concurrent registration in one or more networks associated with the plurality of USIMs.

For example, the UE performing communication using the plurality of USIMs may concurrently register in one or more networks associated with the plurality of USIMs. The UE may determine to release one or more networks associated with the plurality of USIMs according to certain conditions. According to an embodiment, the UE may release the connection with the network associated with any one USIM according to a user input signal. Alternatively, the UE may determine to release the network associated with a specific USIM according to a priority or whether a preset condition is met.

The UE may transmit assistance information for instructing release to the base station or the core network control plane entity. When the UE transmits assistance information to the core network control plane entity, the base station may receive the assistance information from the core network control plane entity. According to an embodiment, the assistance information may be received through an interface (e.g., N2 interface) between the base station and the core network control plane entity.

According to an embodiment, the assistance information may be included in a non-access stratum (NAS) transport message or a NAS deregistration message which may then be received by the core network control plane entity. Further, the assistance information may include information for limiting or allowing the transmission, by the base station or the core network control plane entity, of the paging message to the UE for a predetermined time preset.

According to an embodiment, the information for limiting or allowing paging message transmission may include at least one piece of i) information for instructing that only voice data be paged, ii) information for instructing paging restriction, iii) radio bearer information for limiting or allowing paging, iv) logical channel identification information (LCID), v) a flow identification number, vi) QoS flow ID (QFI) information, and vii) PDU session identification information.

Meanwhile, before the UE determines to release, the base station or core network control plane entity (e.g., AMF) may transmit indication information indicating whether the transmission of assistance information by the UE is allowed. The UE may transmit the assistance information only when the transmission of the assistance information is allowed by the indication information.

The base station may perform the step of controlling paging message transmission to the UE based on the assistance information (S1110).

The base station may determine whether to transmit a paging message to the UE based on the assistance information. When the transmission of the paging message is restricted by the assistance information, the base station controls the transmission of the paging message considering the restriction. Alternatively, the base station may control the paging message to be transmitted in a determined specific paging occasion or paging frame based on the assistance information.

When transmission of a paging message is restricted based on the assistance information, the UE may monitor the paging message considering the restriction. Alternatively, when the transmission of the paging message is allowed based on the assistance information, the UE may monitor the paging message considering the corresponding matter. Alternatively, the UE may monitor a paging message in a specific paging occasion or paging frame determined based on the assistance information.

Meanwhile, the UE may not accept the paging message reception even when the paging message is identified as a result of monitoring the paging message. If the UE does not accept the reception of the paging message, the UE may transmit non-acceptance indication information about the paging message to the base station or the core network control plane entity. The base station may receive non-acceptance indication information.

Whether the UE accepts the reception of the paging message may be determined according to the cause of the paging. For example, the paging message may include paging cause information. The UE may determine whether to accept the reception of the paging message based on the paging cause information. To this end, the base station may include the paging cause information in the paging message and transmit it.

For example, the paging cause information may include information indicating voice data. For example, when the paging cause information indicates voice data, the UE may receive a paging message and, otherwise, may not accept reception.

The above-described operations of the UE and the base station are separately described below in greater detail. The embodiments described below may be performed in any combination by the UE and base station or core network entity.

First, an embodiment of a paging operation of a UE using a plurality of USIMs is described.

An Embodiment for the UE to Require 5G-S-TMSI Reassignment for Paging Collision Avoidance The multi-USIM UE may perform the registration procedure independently for each network associated with its respective USIM. Each core network associated with its respective USIM of the multi-USIM UE may be connected to a different radio network (base station). Alternatively, each core network associated with its respective USIM of the multi-USIM UE may be connected to the same radio network (base station).

First, the embodiment will be described based on a case in which each core network associated with its respective USIM configured in the multi-USIM UE is connected to a different radio network (base station). The multi-USIM UE may transition to an idle state in the network associated with each USIM. The UE may receive configuration information for paging reception from each network (e.g., radio network and/or core network) and produce a paging occasion (PO). To this end, the above-described paging frame (PF) and PO formula of NR may be used. For LTE radio networks, the PF and PO formula specified in 3GPPP TS 36.304 may be used. The two radio networks may be out of synchronization and may have different system frame numbers (SFNs) at a specific point in time. Further, the two radio networks may use different subcarrier spacings, so that scheduling units for radio resources may be different. Accordingly, the UE may encounter an overlap between POs at a specific time.

When each core network associated with its respective USIM configured in the multi-USIM UE is connected to the same radio network (base station), the UE may receive configuration information for paging reception from the corresponding radio network and/or each core network and produce (e.g., estimate) a PO. Despite a single radio network, a PO overlap may occur at a specific time. For example, the UE identifiers allocated to their respective networks producing the PFs/POs may be the same, the values (5G-S-TMSI mod 1024 or UE identifier index values) obtained by performing modular operation on their respective UE identifiers may be the same, or values (UE_ID mod N) obtained by performing modular operation on the 5G-S-TMSI mod 1024 with N (number of total paging frames in T) may be the same.

When the UE recognizes such an issue, the UE may signal the network to address the issue.

For example, the UE may request allocation of a new UE identifier (5G-S-TMSI or 5G-GUTI) from the core network control plane entity (e.g., AMF). 5G-S-TMSI is a temporary UE identifier provided by the 5G core (5GC, e.g., AMF) and represents a UE identifier that uniquely identifies the UE within the tracking area. 5G-S-TMSI has a 48-bit value. 5G-S-TMSI consists of a 10-bit AMF set ID, a 6-bit AMF pointer, and a 32-bit 5G-TMSI. 5G-GUTI (5G globally unique temporary identity) is another temporary UE identifier provided by the 5G core (5GC, e.g., AMF). 5G-S-TMSI is a short form of the 5G-GUTI. 5G-GUTI consists of a GUAMI (globally unique AMF ID) and a 5G-S-TMSI. Therefore, requesting a new 5G-GUTI assignment by the UE may be the same as requesting a new 5G-S-TMSI.

As an example, the UE may request allocation of a new UE identifier (e.g., 5G-S-TMSI or 5G-GUTI) from the AMF through a REGISTRATION REQUEST message. The UE may include indication information for this in the registration request message. As another example, the UE may request allocation of a new UE identifier (e.g., 5G-S-TMSI or 5G-GUTI) from the AMF through any uplink NAS message. The UE may include indication information for this in the uplink NAS message. As still another example, the UE may request allocation of a new UE identifier (e.g., 5G-S-TMSI or 5G-GUTI) from the base station through any uplink RRC message (e.g., UE assistance information message). The base station may include an allocation request on the N2 interface message between the base station and the AMF and transmit it to the AMF. The UE may include indication information for this in any message.

Meanwhile, the AMF may allocate a new UE identifier upon receiving the registration request from the UE. Further, the AMF may include the newly allocated UE identifier in a REGISTRATION ACCEPT message and transmit it. This may be the case even when it is not for periodic registration update. For reference, in the prior art, a new UE identifier could be allocated only for periodic registration update. Alternatively, the AMF may allocate a new UE identifier through a generic UE configuration update procedure and transmit it to the UE.

An Embodiment of Transmitting Assistance Information for Supporting Paging Reception to a Base Station Through RRC Signaling The 5G-S-TMSI reassignment method has a possibility of avoiding collision when all UEs with 5G core network (5GS)-based subscription are in RRC idle mode or RRC inactive mode, but there may be limitations to complete collision avoidance. Further, when a multi-USIM UE transmits and receives data in an active state (e.g., RRC connected) through a network associated with one USIM, the UE may not be able to receive paging through the other network. Further, it may be hard to apply the reallocation method to UEs having a subscription based on an LTE radio network and/or an LTE core network (EPS). In the LTE radio network and/or the LTE core network (EPS), the PF/PO calculation formula uses the IMSI as the UE identifier. The IMSI is a value allocated by subscription, and the IMSI is difficult to reassign. Further, for security reasons, in general, transmission over the wireless section may not be desirable.

Accordingly, an embodiment different from the 5G-S-TMSI reallocation method may be applied.

For example, the multi-USIM UE may perform signaling to the network to support paging reception from the network associated with each subscription. If the UE recognizes that the POs overlap at any specific point in time, the UE may signal the network to address this. Or, when the UE transmits and receives data in an active state (or connected state) on a network associated with one subscription, the UE may signal the network to support paging reception in the idle state or the inactive state over the network associated with the other subscription.

For example, the UE may transmit assistance information for supporting paging reception to the base station through any uplink RRC message. The assistance information may include one or more of the following information.

UE identifier index value: means an information element used for the base station to produce a paging frame. This value may be 10-bit long. For example, it may be 5G-S-

TMSI mod 1024 and/or IMSI mod 1024. For example, when each core network associated with its respective USIM configured in the multi-USIM UE is connected to a different radio network (base station), in a state in which the UE is connected to radio network1 associated with USIM1, the UE may transmit a UE identifier index value associated with USIM2 to radio network1 (base station1). As another example, when each core network associated with its respective USIM configured in the multi-USIM UE is connected to the same radio network (base station), in a state in which the UE is connected to core network1 associated with USIM1 through the radio network, the UE may transmit a UE identifier index value associated with USIM2 to the radio network (base station).

UE specific DRX information: UE-specific DRX cycle information is determined by the AMF at the request of the UE through NAS signaling (e.g., initial registration and mobility registration procedure). Also for this information, the UE may transmit UE-specific DRX associated with the USIM other than the connected USIM.

RAN paging cycle (ran-PagingCycle) information: UE specific DRX cycle is allocated by the base station for the RRC inactive UE and is used for radio network initiated paging. Also for this information, the UE may transmit UE-specific DRX associated with the USIM other than the connected USIM.

Periodic registration update timer information: When a UE is not registered for emergency services, and timer T3512 expires, the periodic registration update procedure shall be started. When the UE performs the periodic registration update procedure, the AMF may allocate a new UE identifier. Accordingly, the base station may need the corresponding information to estimate a time period during which a paging collision may occur. Also for this information, the UE may transmit the parameter value associated with the USIM other than the connected USIM.

Periodic RAN notification area update timer information: The UE starts periodic RNA update when the periodic RNA update timer (e.g., T380) expires. The base station may need the corresponding information to estimate the occurrence of a paging collision according to the RNA update. Also for this information, the UE may transmit the parameter value associated with the USIM other than the connected USIM.

MICO (mobile initiated connection only) mode indication information: If the AMF has enabled a mode (MICO mode) that supports only mobile-initiated connection for the UE, the UE may transfer indication information indicating that it is in the MICO mode. Also for this information, the UE may transmit the parameter value associated with the USIM other than the connected USIM.

Timing difference information between two radio networks (base stations): For example, when each core network associated with its respective USIM configured in the multi-USIM UE is connected to a different radio network (base station), in a state in which the UE is connected to radio network1 associated with USIM1, the UE may transmit timing difference-related information between radio network1 (or UE selected cell/serving cell/PCell/any serving cell associated with base station1) and radio network2 (or cell selected by the UE associated with base station2) associated with USIM2 to radio network1 (base station1). For convenience of description, camp-on-cell/serving cell/ PCell of radio network1 associated with USIM1 is denoted as PCell1, and camp-on-cell/serving cell/PCell of radio network2 associated with USIM2 is denoted as PCell2. This is so done simply for ease of description, and it may be replaced with another term. Timing difference information between two radio networks (base stations) may include one or more pieces of information among the SFN difference (SFN offset) between PCell1 and PCell2, PCell1 and PCell2 frame boundary offset, PCell1 and PCell2 subframe boundary offset, and offset (frame boundary offset) between the first slot of the PCell1 frame and the first slot of the PCell2 frame. The timing difference information between the two radio networks (base stations) may further include a cell identifier (e.g., physical cell identity or CGI or servcellindex or scellindex) of PCell1.

Default paging cycle (defaultPagingCycle) information: this information is used to obtain the DRX cycle (T) of the UE and indicates a value transmitted through system information from the base station associated with the USIM other than the connected USIM.

nAndPagingFrameOffset information: this information indicates the total number of paging frames (N) in the DRX cycle (T) of the UE and paging frame offset (PF_offset) information used for paging frame determination.

ns: Number of paging occasions for a PF.

firstPDCCH-MonitoringOccasionOfPO information: this information indicates the first PDCCH monitoring occasion for paging for each PO of the PF.

nB: it denotes a value transmitted through the system information when the base station associated with the USIM other than the connected USIM is an LTE base station. Parameter information used to derive a paging frame and a paging occasion Paging collision indication information: If the multi-USIM UE enters the networks associated with two subscriptions in the RRC idle or RRC inactive state, the UE may estimate whether a paging collision is to occur. When a paging collision is expected, the UE may transmit indication information for this to the base station. The corresponding information may transmit one or more pieces of information among the paging collision period, the expected time for next paging collision, the remaining time until the next paging collision, the expected duration of the paging collision. The base station may request information from the UE to receive the paging collision indication information, or the base station may transmit indication information allowing information transmission and receive information.

Meanwhile, the UE may transmit the above-described one or more pieces of assistance information for supporting the paging reception to the base station through the UE assistance information RRC message. Alternatively, the UE may transmit the above-described one or more pieces of assistance information for supporting the paging reception to the base station through an RRC setup complete message. Alternatively, the UE may transmit the above-described one or more pieces of assistance information for supporting the paging reception to the base station through a measurement reporting (MeasurementReport) message.

The base station may request the information from the UE to receive the above-described assistance information, or the base station may transmit indication information allowing information transmission and receive assistance information from the UE. As an example, the base station may transmit one-bit indication information in the system information and receive it. As another example, if any related information is included in the system information, the base station may allow the UE to transmit the corresponding information and may receive it. As still another example, the base station may request to transmit the corresponding information through any downlink RRC message and receive the corresponding information from the UE.

The base station may transfer the received information to the AMF.

An Embodiment of Transmitting Assistance Information for Supporting Paging Reception to a Base Station Through NAS Signaling The UE may be assigned a new UE temporary identifier (5G-S-TMSI) in the network initial registration process. Alternatively, the UE may be assigned a new UE temporary identifier (5G-S-TMSI) in the periodic registration update process. Therefore, it may be preferable to transfer the assistance information for supporting the above-described paging reception when the UE performs the initial registration procedure. Alternatively, it may be preferable to transfer the assistance information for supporting paging reception when the UE performs periodic update. Alternatively, some of the above-described information may be transmitted by the UE to the base station through RRC signaling. Some of the above-described information may be transferred by the UE to the core network entity (e.g., AMF) through NAS signaling. The corresponding core network entity may transfer it to the base station.

According to an embodiment, the UE may transmit the above-described one or more pieces of assistance information for supporting the paging reception to the AMF through a NAS transport procedure. According to another embodiment, the UE may transmit the above-described one or more pieces of assistance information for supporting the paging reception to the AMF through the registration procedure. According to still another embodiment, the UE may transmit the above-described one or more pieces of assistance information for supporting the paging reception to the AMF through the service request procedure.

For example, the AMF may request the information from the UE to receive the above-described assistance information, or the AMF may transmit indication information allowing information transmission and receive the corresponding information from the UE. Alternatively, the UE capable of the corresponding function may be configured to include the corresponding information. To that end, capability information may be defined and configured in the UE. For example, indication information for indicating that the UE is capable of supporting multiple USIMs may be defined and configured. And/or in the case of a single-reception/single-transmission UE (single Rx/single Tx UEs) or a dual-reception/single-transmission UE (dual Rx/single Tx UEs) UE, the corresponding information may be included and transmitted. Alternatively, when the authority is authenticated by the core network entity (e.g., UDM, HSS) through core network signaling, the AMF may receive it and transmit it to the base station.

Meanwhile, when the base station receives assistance information for supporting paging reception through the above-described methods, the base station may enable the UE to receive paging from the network associated with each subscription according to the information. For example, when the multi-USIM UE is in the state connected with the radio network associated with one USIM, the base station may skip radio resource scheduling for a time when paging reception is expected from the network associated with the other USIM. As another example, when the multi-USIM UE is in the state connected with the radio network associated with one USIM, the base station may provide the UE with information about the time gap when paging reception is expected from the network associated with the other USIM. The corresponding gap information may be a value obtained by converting the PO of the radio network associated with the USIM other than the USIM associated with the connected base station into a system frame number corresponding to the PCell of the corresponding connected base station and an occasion within the corresponding system frame number. For example, the frame SFN may be a value obtained by subtracting (or adding or subtracting) the SFN difference (SFN offset) between two radio networks from the value obtained by performing modular operation with the UE's DRX cycle (T).

In other words, (SFN+PF_offset−SFN difference) mod T=(T div N)*(UE_ID mod N) or SFN+PF_offset+SFN difference) mod T=(T div N)*(UE_ID mod N). Here, the PF_offset, T, N, and UE_ID parameters are values used to produce a paging frame of the radio network associated with the USIM other than the USIM associated with the connected base station and may be values received by the base station from the UE. PO may also be a value obtained by subtracting (or adding or subtracting) the frame boundary offset from the existing PO. When the corresponding information is indicated, the UE may be allowed not to perform one or more operations among arbitrary active state operations. For example, the UE may skip all or one or more of any active state operation SRS transmission for the serving cell (PCell or SCell) associated with the connected base station, CSI reporting, PDCCH monitoring, PUCCH transmission, serving cell measurement, intra frequency measurement, inter-frequency, and inter-RAT frequency measurement. Alternatively, the UE may perform paging reception for the PCell of the radio network associated with the USIM other than the USIM associated with the connected base station. To that end, the gap information may include cell identification information about the corresponding cell.

The above-described assistance information transmitted by the UE to the base station or the core network entity may be included in the assistance information transmitted by the UE to the base station or the core network entity described in FIGS. 10 and 11. Alternatively, transmission/reception information between the above-described UE and the base station may be performed through separate signaling. Hereinafter, an embodiment of an operation for reducing a service interruption of a UE will be described in more detail.

An Embodiment of Delaying/Letting Pending the RNAU or TAU

When the UE is in the RRC inactive state or the RRC idle state on each network associated with its respective one of the plurality of USIMs, a RAN-based notification area update (RNAU) or tracking area update (TAU) may begin/occur according to the movement of the UE or according to the periodic timer configured by the base station or core network entity (e.g., AMF).

When Both Access Stratums (Ass) Associated with Two USIMs are in RRC Idle and/or RRC Inactive State For example, when the multi-USIM UE is in the RRC inactive state on the network associated with one USIM while being in the RRC idle state on the network associated with the other USIM, a RAN-based notification area update (RNAU) or tracking area update (TAU) may occur according to the movement of the UE or periodic timer (e.g., T380 timer in the RRC inactive state and periodic registration update timer (T3612) n the RRC idle state). If a collision is detected from the non-access stratum (NAS) or access stratum (AS) in the UE associated with the two USIMs, the UE may adjust and process it. As an example, the UE may process it with priority according to the configuration information indicated by the base station or core network entity (e.g., AMF). Alternatively, the UE may process it with priority according to preconfigured information according to user preference information and the like.

If the USIM subscription associated with the RRC inactive state takes priority, the UE may first process the corresponding RNA update. The UE may set the TAU update to the pending state in the RRC idle state associated with the other USIM. For example, when the UE initiates the RRC establishment/setup procedure, the UE may define a related variable (e.g., pendingTAupdate) and set the variable to true. After the RNA update is finished, the UE may enter the RRC inactive state (or RRC idle state) in the network associated with the corresponding USIM. In this case, the UE may set the corresponding variable to false. The UE may indicate the NAS of this in the AS. For the AS and NAS, AS_A and NAS_A configured by being mapped to the base station (base station_A)/AMF (AMF_A) associated with one USIM (USIM_A) and AS_B and NAS_B configured being mapped to the base station (base station_B)/AMF (AMF_B) associated with the other USIM (USIM_B) may be independently configured and operated. Alternatively, one AS and one NAS may be configured, and two entities may be configured within each AS and NAS and be operated independently.

The UE may initiate a TAU update. To that end, an occurrence of any AS procedure operation (e.g., RRC procedure, RRC connection setup request message transmission, RRC connection resume request message transmission, RNAU, paging message reception) or any NAS procedure operation (e.g., registration request message, service request message, control plane service request message, NAS transport message transmission, TAU, paging message reception) between AS_A and AS_B or between NAS_A and NAS_B may be allowed to be indicated.

For example, the UE may initiate RRC resume request message transmission to update RNA in the RRC inactive state in association with one USIM (USIM_A). The corresponding AS (AS_A) indicates this to the AS (AS_B) associated with the other USIM (USIM_B). In the RRC idle state associated with the other USIM, an upper layer may request establishment of an RRC connection for TA update. If the UE initiates transmission of an RRC resume request message for RNA update in association with USIM_A, the UE sets the TAU update to the pending state in association with USIM_B. After the RNA update in association with USIM_A is finished, the UE may enter the RRC inactive state (or RRC idle state) in the network associated with the corresponding USIM. The corresponding AS (AS_A) indicates this to the AS (AS_B) associated with the other USIM. Alternatively, the corresponding AS (AS_A) may indicate this to the NAS (NAS_A), NASA indicates this to NAS_B associated with the other USIM, and NAS_B indicates this to the AS (AS_B). The UE may set the corresponding variable to false in AS_B. The UE may indicate the NAS of this in the AS. As described above, for the corresponding AS and NAS, AS_A, AS_B, NAS_A, and NAS_B may be independently configured and operated, and one AS and one NAS may be configured to be independently operated in each AS and NAS. The UE may initiate a TAU update.

If the USIM subscription associated with the RRC idle state takes priority, the UE may first process the corresponding TA update. The UE may set the RNA update to the pending state in the RRC inactive state associated with the other USIM. For example, when the UE initiates the RRC resume procedure, the UE may define a related variable (e.g., pendingRNAupdate or a new variable) and set the variable to true. After the TA update is finished, the UE may switch to the RRC inactive state (or RRC idle state) in the network associated with the corresponding USIM. The UE may set the corresponding variable to false. The UE may indicate the NAS of this in the AS. As described above, for the corresponding AS and NAS, AS_A, AS_B, NAS_A, and NAS_B may be independently configured and operated, and one AS and one NAS may be configured to be independently operated in each AS and NAS. The UE may initiate a RNAU update. To that end, the UE may indicate an occurrence of any AS procedure operation (e.g., RRC procedure, RRC connection setup request message transmission, RRC connection resume request message transmission, RNAU, paging message reception) or any NAS procedure operation (e.g., registration request message, service request message, control plane service request message, NAS transport message transmission, TAU, paging message reception) between AS_A and AS_B or between NAS_A and NAS_B, similarly to those described above. The indication procedure between AS (AS_A) and AS (AS_B) may use the above-described procedure.

When the AS Associated with One USIM is in RRC Connected State, and the AS Associated with the Other USIM is in RRC Idle/RRC Inactive State The multi-USIM UE may be in the RRC connected state on the network associated with one USIM (USIM_A) and in the RRC inactive state or the RRC idle state on the network associated with the other USIM (USIM_B). In this case, a RAN-based notification area update (RNAU) or tracking area update (TAU) may begin/occur according to the movement of the UE or the periodic timer (e.g., T380 in the RRC inactive state or periodic registration update timer (T3612) in the RRC idle state).

The UE may set the RNA update to the pending state in the RRC inactive state in the network associated with the other USIM (USIM_B). For example, the UE may define a related variable (e.g., pendingRNAupdate or a new variable) and set the variable to true. When the RRC resume request procedure for RAN update is initiated in association with USIM_B, the UE sets the RNA update to the pending state in association with USIM_B at an arbitrary time related to the corresponding procedure. For example, the arbitrary time may be any one of a time of triggering to resume RRC connection by a response to NG-RAN paging, a time of performing an integrated access control procedure, a time of triggering to resume RRC connection by the upper layer, before starting to transmit an RRC resume request message, a time of entering/switching to the connected state from AS_A, and an end time of a gap configured for AS_B operation from AS_A. The gap will be further described below.

The UE may enter the RRC inactive state or the RRC idle state from the RRC connected state for USIM (USIM_A) in the RRC connected state. AS_A may indicate this to AS_B. The UE may set the corresponding variable to false. The UE may indicate the NAS of this in the AS. As described above, for the corresponding AS and NAS, AS_A, AS_B, NAS_A, and NAS_B may be independently configured and operated, and one AS and one NAS may be configured to be independently operated in each AS and NAS. The UE may initiate a RNAU update. The UE may set the resumption cause to RNA update and initiate the RRC resume procedure. This may be applied when the USIM subscription associated with the RRC connected state takes precedence or the corresponding configuration does not exist. Alternatively, when the gap configured for AS_B operation from AS_A starts, the UE may set the corresponding variable to false. The UE may indicate the NAS of this in the AS. The UE may set the resumption cause to RNA update and initiate the RRC resume procedure. The indication procedure between AS (AS_A) and AS (AS_B) may use the above-described procedure.

The UE may set the TA update to the pending state in the RRC idle state in the network associated with the other USIM (USIM_B). For example, when the UE initiates the RRC establishment/setup procedure, the UE may define a related variable (e.g., pendingTAupdate, pendingsetup) and set the variable to true. The UE may enter the RRC inactive state or RRC idle state from the RRC connected state for USIM (USIM_A) in the RRC connected state. The corresponding AS (AS_A) indicates this to the AS (AS_B) associated with the other USIM. The UE may set the corresponding variable to false. The UE may indicate the NAS of this in the AS. The UE may initiate a TAU update. This may be applied when the USIM subscription associated with the RRC connected state takes precedence. Alternatively, it may be applied when the corresponding configuration does not exist.

The UE may set the RNA/TA update to the pending state in the RRC inactive state and in the RRC idle state in the network associated with the other USIM. For example, the UE may keep the RNA/TA update pending until the gap/period/duration/cycle indicated by the base station is initiated/started/repeated (or until a predetermined offset before the corresponding time, e.g., until the offset indicated by the base station). For convenience of description, this is denoted as a gap below.

For example, when the multi-USIM UE is in the state connected with the radio network associated with one USIM (USIM_A), the base station (base station_A) may skip radio resource scheduling for a time/period/duration when paging reception is expected from the network (network_B) associated with the other USIM (USIM_B). As another example, when the multi-USIM UE is in the state connected with the radio network associated with one USIM (USIM_A), the base station (base station_A) may skip radio resource scheduling for a time/period/duration when (periodic) TAU or RNAU is expected from the network (network_B) associated with the other USIM (USIM_B). As still another example, when the multi-USIM UE is in the connected state with the radio network associated with one USIM (USIM_A), the base station (base station_A) may configure a gap/pattern/period (e.g., including one or more pieces of information among the start offset/frame/slot/subframe/time, duration/length, repetition period, timing advance, and timing difference between the two radio networks) when the UE may perform any operation, such as tuning/measurement/monitoring/connection setup/registration/TAU/RNAU/uplink transmission with the network (network B) associated with the other USIM (USIM_B) and skip radio resource scheduling in association with the corresponding USIM, in the corresponding gap/pattern/period.

As further another example, when the multi-USIM UE is in the state connected with the radio network associated with one USIM, the base station may indicate, to the UE, the time gap when paging reception is expected from the network associated with the other USIM. The corresponding time gap information may be a value obtained by converting the PO of the radio network associated with the USIM other than the USIM associated with the connected base station into a system frame number corresponding to the PCell of the corresponding connected base station and an occasion within the corresponding system frame number. For example, the frame SFN may be a value obtained by subtracting (or adding or subtracting) the SFN difference (SFN offset) between two radio networks from the value obtained by performing modular operation with the UE's DRX cycle (T). In other words, (SFN+PF_offset−SFN difference) mod T=(T div N)*(UE_ID mod N) or SFN+PF_offset+SFN difference) mod T=(T div N)*(UE_ID mod N).

Here, the PF_offset, T, N, and UE_ID parameters are values used to produce a paging frame of the radio network associated with the USIM other than the USIM associated with the connected base station and may be values received by the base station from the UE. PO may also be a value obtained by subtracting (or adding or subtracting) the frame boundary offset from the existing PO. When the corresponding information is indicated, the UE may be allowed not to perform one or more operations among arbitrary active state operations. For example, the UE may skip all or one or more of any active state operation SRS transmission for the serving cell (PCell or SCell) associated with the connected base station, CSI reporting, PDCCH monitoring, PUCCH transmission, serving cell measurement, intra frequency measurement, inter-frequency, and inter-RAT frequency measurement. Alternatively, the information may perform paging reception for the PCell of the radio network associated with the USIM (USIM_B) other than the USIM (USIM_A) associated with the connected base station. Alternatively, the UE may perform RNAU or TAU. To that end, the gap information may include cell identification information about the corresponding cell. As another example, the gap may be indicated as a multiple of the DRX cycle. As further another example, the gap may be indicated as information including a start time (e.g., slot) and a required time. As still another example, the corresponding gap may be indicated as slots/subframes/frames into which the estimated time required to perform RANU or TAU has been converted.

The UE may enter the RRC inactive state or the RRC idle state from the RRC connected state for USIM (USIM_A) in the RRC connected state. The corresponding AS (AS_A) indicates this to the AS (AS_B) associated with the other USIM. The UE may set the corresponding variable to false.

Or, the UE may keep the RNA/TA update pending in the RRC connected state for USIM_A until the start of the next gap (or until a predetermined offset before the corresponding time, e.g., until the offset time indicated by the base station). For example, the UE may set the corresponding variable to false. Alternatively, the UE may set the corresponding variable to true when the duration/length of the corresponding gap ends. The UE may indicate this to an upper layer. The UE may initiate a NAS or RRC procedure for RNA/TA update.

The above-described gap information and information transmitted by the UE to the base station, or the core network entity may be included in the assistance information described with reference to FIGS. 10 and 11. Alternatively, transmission/reception information between the above-described UE and the base station may be performed through separate signaling.

An Embodiment of Delaying/Letting Pending the RNAU or TAU During Handover

The multi-USIM UE may be in the RRC connected state on the network associated with one USIM (USIM_A) and in the RRC inactive state or the RRC idle state on the network associated with the other USIM (USIM_B). In this case, when a handover procedure is performed on the corresponding USIM (USIM_A) according to the movement of the UE, a RAN-based notification area update (RNAU) or tracking area update (TAU) may initiate/occur on the network associated with the other USIM (USIM_B). Or, when the handover procedure is performed on the corresponding USIM (USIM_A), an occasion where paging reception is expected on the network associated with the other USIM (USIM_B), or the above-described gap configured by the base station may occur. If the UE performs any operation (e.g., tuning/measurement/monitoring/connection setup/registration/TAU/RNAU/uplink transmission) in association with the other USIM while handover is performed in association with the one USIM, the service interruption may occur during handover.

Accordingly, the base station may configure a specific condition and instruct to perform only the operation on the serving network while disregarding the above-described gap configured by the base station or entering the occasion when paging reception is expected on the network associated with the other USIM (USIM_B) under the corresponding condition. For example, upon receiving an RRC reconfiguration message including information necessary to access the target cell (reconfiguration with Sync), the UE may keep the RNAU or TAU on the network associated with the other USIM pending until synchronizing to the target cell and completing the RRC handover procedure by sending an RRC reconfiguration complete message to the target base station (target gNB). The UE may set the corresponding variable to the pending state (e.g., true). Alternatively, the UE may disregard the gap indicated by the base station or stop/suspend/hold/refrain from starting the procedure associated with the other USIM expected for that gap. The UE may set the variable to false after transmitting the RRC reconfiguration complete message to the target base station. The UE may indicate this to an upper layer. Thereafter, the UE may initiate a NAS or RRC procedure for RNA/TA update associated with the other USIM. Alternatively, the UE may receive paging associated with the other USIM.

An Embodiment of Defining UE Capability Information to Support Multi-USIM Functions Regardless of Band Combination The network (ex. AMF) or base station may receive corresponding UE capability parameter information from the UE to apply the above-described multi-USIM function or any function for multiple USIMs to the multi-USIM UE in the disclosure. For example, the corresponding parameter may be defined for each functional. As another example, the corresponding parameter may include information (e.g., MRDC Single UL transmission) for indicating that the UE does not support simultaneous UL transmissions.

The multi-USIM function may be applied to a UE supporting the dual-connectivity function. For example, the AMF or base station may apply the above-described multi-USIM function or any function for multiple USIMs to UEs having the MRDC UE capability (e.g., MRDC-Parameters singleUL-Transmission) (or UEs transmitting corresponding information) applied to dual connectivity (DC) or multi-RAT dual connectivity (MRDC) capable UEs.

As further another example, the multi-USIM function should be applicable to UEs that do not support the dual-connectivity function. To that end, the corresponding function may be applied to UEs without MRDC UE capability (e.g., MRDC-Parameters) (or UEs not transmitting corresponding information) applied to dual connectivity (DC) or multi-RAT dual connectivity (MRDC) capable UEs if they have UE capability supporting the multi-USIM function. In this case, the network or the base station may include information for indicating whether the UE supporting the multi-USIM function performs uplink simultaneous UL transmissions and/or downlink simultaneous DL reception. The corresponding information does not need to be defined for each band combination, unlike the UE capability information included in the MRDC-parameter. In other words, the corresponding information may be defined for any band or any band combination. For example, it may include a single TX parameter indicating whether simultaneous uplink transmissions are possible and a single RX parameter indicating whether simultaneous downlink receptions are possible. Each corresponding parameter may be one-bit long.

As still another example, if a multi-USIM UE capable of performing the above-described multi-USIM function or any function for multiple USIMs is set to perform a single USIM operation, the base station or network needs to recognize it. For example, the user may disable one of the two USIMs by changing the settings. The base station or network associated with the other USIM which is not disabled may have configure corresponding information in the UE to support paging reception for the UE from the base station or network associated with the disabled USIM. In this case, the UE may unnecessarily fail to receive scheduling during a certain period for paging reception from the base station or network associated with the disabled USIM according to the corresponding configuration. To prevent this, the UE may inform the base station or AMF that the multi-USIM function has been disabled through any uplink signaling message. If the base station is informed through the RRC message, the base station may inform the AMF of this and, if the AMF is informed through a NAS message, the AMF may inform the base station of this. The message transmitted from the UE to the base station or AMF may be one of any uplink messages mentioned in the foregoing embodiments.

The message transmitted by the UE to the base station or the AMF may include one or more of information for identifying the corresponding USIM, an index for differentiating the corresponding USIM, cell information (e, g, cell identifier or PCI) about the camp-on/cell selection/cell reselection by the UE in association with the corresponding USIM, network information (e.g., PLMN ID, PLMN ID list, and tracking area code), and frequency (e.g., dl-CarrierFreq) of the corresponding cell. The base station or AMF may instruct the UE to release multi-USIM-related configurations. For example, a corresponding radio resource configuration may be modified/released through an RRC reconfiguration message or the like.

When the multi-USIM UE switches USIMs as in the embodiment, the base station associated with the connected USIM may indicate, to the UE, information assisting cell selection/cell reselection associated with the other USIM to support fast switching. For example, when releasing the RRC connection associated with the connected USIM and setting up an RRC connection associated with the inactive/idle USIM, the base station associated with the connected USIM may indicate, to the UE, information assisting cell selection/cell reselection associated with the other USIM to support fast switching. The message transmitted by the UE to the base station or the AMF may include one or more of i) information for identifying the corresponding USIM, ii) an index for differentiating the corresponding USIM, iii) cell information (e, g, cell identifier or PCI) about the camp-on/cell selection/cell reselection by the UE in association with the corresponding USIM, iv) network information (e.g., PLMN ID, PLMN ID list, and tracking area code), and v) frequency (e.g., dl-CarrierFreq) of the corresponding cell. The UE may perform cell selection/cell reselection using the received information.

For example, the UE may consider the corresponding cell/frequency as the cell/frequency with the highest priority according to the received information. As another example, if the corresponding information is received, the UE may disregard all priorities provided in the system information. As further another example, the UE may (preferentially) perform cell reselection among the cells included in the corresponding cell/cell list.

Meanwhile, if the service in the network associated with the other USIM is terminated, the UE may use the existing RRC procedure (e.g., RRC connection resumption procedure) to resume connection to the base station which was connected before. For example, the UE receives an RRC connection release message from the base station associated with the other USIM. The UE receives the RRC connection release message and performs an operation for entering the RRC idle state. Upon receiving the RRC connection release message, the UE completes the state switch to the RRC idle state. Or, the UE receives the RRC connection release message and enters the RRC inactive state. Or, a predetermined time after the UE requests the network or base station to suspend (after a predefined time or the timer set with an indicated time expires), the UE may resume connection with the base station which used to be connected before, using the existing RRC procedure (e.g., RRC connection resume procedure).

According to an embodiment, the UE may enter the RRC inactive state immediate after transmitting the suspend instruction (or after an indicated time or autonomously). For example, without performing an RRC release procedure including suspend configuration information from the base station, the UE may switch to the RRC inactive state. As another example, the UE may not expect reception of an RRC message responsive to the suspend instruction request RRC message from the base station. By receiving an HARQ ACK for the MAC PDU including the RRC message from the MAC entity or receiving an ACK (through a status report) for the RLC PDU including the RRC message from the RLC AM entity, the UE may identify that the corresponding RRC message has been successfully transmitted. If identified, the UE may enter the RRC inactive state immediate immediately (or after an indicated time or autonomously). Or, upon failing to identify successful transmission for the RRC message, the UE may perform retransmission of the RRC message (e.g., HARQ retransmission, RLC retransmission, or retransmission on RRC when RLC failure occurs). Or, when an RLC failure occurs, the UE may switch to the RRC idle mode without performing an RRC connection reestablishment procedure. Or, when suspend configuration information is configured in the UE, the UE may switch to the RRC inactive mode.

The information transmitted by the UE to the base station or the core network entity in each of the above-described embodiments may be included in the assistance information described with reference to FIGS. 10 and 11. Alternatively, transmission/reception information between the above-described UE and the base station may be performed through separate signaling.

Hereinafter, an embodiment for preventing data transmission/reception collision when a multi-USIM UE transmits/receives data in association with a plurality of USIMs will be described in detail.

An Embodiment of Defining a Switching Condition and Requesting the Base Station to Pause/Suspend/Release the Connection when the Corresponding Condition is Met The UE may instruct/request to pause/suspend/release wireless connection with base station A transmitting/receiving data in the already connected state. For convenience of description, this is referred to as a suspend request. However, the embodiments are not limited thereto. The suspense request may be replaced with other similar terms. To support fast network switching or prevent abnormal operation of the UE, it is preferable to clearly define conditions for triggering to transmit a suspend request to the base station. The condition may be pre-configured in the UE or may be instructed to be configured in the UE by the base station.

Configuration of Information for Allowing Request Transmission and/or Prohibit Timer The base station may configure configuration information for instructing the UE to allow a suspend request transmission in the UE. The UE may transmit a suspend request to the base station only when the information allowing the suspend request transmission is configured. The information may be indicated to the UE through system information for enabling cell-specific instructions. Or, the information may be indicated to the UE through an RRC dedicated message (e.g., RRC reconfiguration message).

Thus, when in the connected state, the UE may transmit a suspend request to the base station. For example, the base station may set (setup/release) information allowing to send suspend request information in the Other Configuration information element (otherconfig) included in the RRC reconfiguration message. The suspend request information may denote the information for instructing/requesting the UE to suspend in the RRC inactive state. Or, the suspend request information may denote the information for instructing/requesting the UE to release the connection to the RRC idle state. The suspend request information may indicate information for indicating that the UE will soon switch to the RRC inactive/RRC idle state in association with the corresponding USIM. The suspend request information may include a suspend request prohibit timer for prohibiting the UE from continuous transmission of the corresponding information. If the UE is configured to be able to provide suspend request information, when setting content of an uplink message (e.g., UE assistance message) including the suspend request information or transmitting the message to the base station, the timer set to the suspend request prohibit timer received from the base station may be started or restarted. If the UE experiences, e.g., a radio link failure and thus initiates a connection reconfiguration procedure, the timer, set with the suspend request prohibit timer value and started or restarted, is stopped.

Request Transmission when Paging Reception is Transferred to NAS or AS Associated with the Other USIM Upon (successfully) receiving a paging message for the UE from the network (or base station B) associated with the other USIM than the connected USIM, the UE may transmit a suspend request to base station A associated with the connected USIM. From a viewpoint of one UE, communication modules associated with their respective USIMs may be independently configured. For example, the application layers, NASs, and ASs associated with the respective USIMs may be independently implemented and operated. For convenience of description, these are denoted as application layer A, application layer B, NAS_A, NAS_B, AS_A, and AS_B.

For example, the AS_B of the UE receiving the paging message from base station B may directly transfer it to AS_A. As another example, the AS_B of the UE receiving the paging message from base station B may transfer it to upper layer_B (e.g., NAS_B and/or application layer B), and upper layer_B may transfer it to upper layer_A. As further another example, upon receiving information indicating that the paging message for the UE has been (successfully) received from base station B, from AS_B, AS_A may transmit a suspend request to base station A associated with the connected USIM. As still another example, upon receiving information indicating that the paging message for the UE has been (successfully) received from base station B, from upper layer_A, AS_A may transmit a suspend request to base station A associated with the connected USIM.

Send Request Considering Preference Information

When relevant user preference information is pre-configured/set, the UE may transmit an instruction to suspend to base station A associated with the connected USIM. It may be determined by a UE user input signal whether to keep the on-going service in association with the connected USIM or to operate to receive a new incoming service in association with the other USIM. Or, the related user preference information (or default configuration information) may be pre-configured in the UE or be indicated and configured in the UE by the base station.

According to an embodiment, the user preference information may be implemented to be set in the UE directly by the user. The information may include one or more pieces of information among preference/priority of USIM (e.g., priority of USIM A>priority of USIM B), preference/priority of network (e.g., PLMN) associated with USIM (e.g., priority of PLMN A>priority of PLMN B), whether to allow data transmission (e.g., one or more of voice, SMS, multimedia, or data) or paging reception from the other network in the state connected with the network associated with one USIM, and category (e.g., one or more of voice, SMS, multimedia, or data) of service allowed for data transmission or paging reception from the other network in the state connected with the network associated with one USIM.

According to another embodiment, upon setting up connection to base station B due to the USIM preferred by the user preference information, network associated with the preferred USIM, or preferred service, the UE may transmit a suspend instruction to base station A associated with the connected USIM.

Transmission of Request when Paging Indicates a Specific Service

Upon receiving one of the MMTEL voice, MMTEL video, and SMS for the UE from the network (or base station B) associated with the other USIM than the connected USIM, the UE may transmit a suspend request to base station A associated with the connected USIM.

As an example, the base station may include information indicating that the service triggering the paging is any one of the MMTEL voice, MMTEL video, or SMS, as a new information element, in the paging message. As another example, the base station may include information indicating that the service triggering the paging is any one of the MMTEL voice, MMTEL video, or SMS, as a new information element, in the paging record (PagingRecord) information element in the paging message. As further another example, the base station may receive the paging message including the information indicating that the service triggering the paging is any one of the MMTEL voice, MMTEL video, or SMS and the UE initiates a service request procedure. Accordingly, an RRC connection setup message (RRC Setup) received from the base station in response to the RRC connection setup request message (RRC Setup Request) or any downlink RRC message (e.g., RRC connection reconfiguration message) generated thereafter may include information indicating that the service triggering the paging is one of the MMTEL voice, MMTEL video, or SMS. As still another example, for the UE to receive the paging message including information indicating that the service triggering the paging is one of the MMTEL voice, MMTEL video, or SMS and initiate a service request procedure, the base station may include the information indicating that the service triggering the paging is one of the MMTEL voice, MMTEL video, or SMS in the MSGB when performing random access to the UE or performing MSG2 or 2-step random access. To indicate this, the base station may generate an MAC CE and indicate it. The MAC CE may include an information field for identifying the corresponding service. Or the corresponding service may be identified using the LCID. Or, a differentiated MAC PDU may be included in the MSGB to identify and indicate the corresponding service. As yet another example, the base station may be configured to perform paging to the UE only when paging is indicated by one service of the MMTEL voice, MMTEL video, or SMS for the multi-USIM UE. The information may be set by receiving corresponding information from the UE or the UE's subscription information.

Performing Signaling with the Corresponding Network/Base Station According to Switching Determination The multi-USIM UE may perform registration in association with each USIM. For example, the UE may perform a registration procedure to the corresponding network in association with one USIM. The UE may perform a registration procedure to the corresponding network in association with the other USIM in the idle state or inactive state with the network associated with the corresponding USIM. The multi-USIM UE may be required to perform communication in the active state (e.g., RRC connected state) through the system associated with one USIM while performing another activity (e.g., paging reception in the RRC idle or RRC inactive state, connection setup according thereto, tracking area update or RNAU according to the UE movement, RAN-based notification area update, or connection setup due to generation of mobile transmission data in the RRC idle or RRC inactive state) in the system associated with the other USIM.

According to the above-described embodiments, the UE may determine whether to keep the on-going service in association with the connected USIM or to operate to receive a new incoming service in association with the other USIM.

Upon Determining to Maintain Connection with Associated USIM (not to Switch)

Upon determining not to switch, the UE may maintain the on-going service in association with the connected USIM.

The UE may indicate rejection of paging reception to the base station/AMF when receiving paging in association with the other USIM. For example, the UE may indicate rejection of the corresponding paging message through one of any uplink NAS messages (e.g., registration request message, service request message, control plane service request message, NAS transport message). The AMF may send an accept message or ack message for this to the UE. Alternatively, the AMF may not send an accept message or ack message. As another example, the UE may initiate a de-registration procedure. The UE may indicate rejection of paging reception to the base station/AMF through the UE-initiated DEREGISTRATION REQUEST message.

The AMF may transmit it to the base station. The downlink message through the interface between the base station and the AMF may include indication information therefor.

As another example, the UE may indicate rejection of the corresponding paging message through one of any uplink RRC messages (e.g., RRC setup request message, UL Information transfer message, and UE assistance message). Information for indicating this may be included in the corresponding message. Alternatively, the UE may generate an MAC CE and indicate it. Alternatively, the UE may indicate it by specifying and using a specific LCID. As another example, the UE may indicate rejection of the corresponding paging message through a FailureInformation RRC message. Information for indicating this may be included in the corresponding message. Alternatively, the UE may generate an MAC CE and indicate it. Alternatively, the UE may indicate it by specifying and using a specific LCID.

Upon receiving the indication from the UE, the base station may transmit it to the AMF. For example, the base station may include the indication information in the uplink message through the interface between the base station and the AMF.

Meanwhile, in the above-described embodiments, each corresponding message/indication information may include indication information for recommending/restricting the next paging attempt. For example, information for indicating that a paging attempt is recommended/allowed for the UE may be included. For example, service/radio bearer/LCID/flow/QFI/PDU session information for which a paging attempt is recommended for the corresponding UE may be included. To this end, it may include one or more pieces of information about service type (voice)/radio bearer identification information/LCID/flow identification information/QFI/PDU session identification information recommended/allowed for a paging attempt for the corresponding UE. The network receiving the corresponding indication information may attempt paging when paging is started by the corresponding service (voice)/radio bearer/LCID/flow/QFI/PDU session for the corresponding UE. As another example, it may include indication information for restricting paging for the corresponding UE. Upon receiving the indication information, the network may not attempt paging in whatever occasion, for the UE. Or, upon receiving the indication information, the network may not attempt paging for the UE, except for emergency services. As still another example, the indication information for restricting the UE to perform paging may include a timer for restricting paging. For convenience of description, the timer is denoted as a back-off timer. This is merely for convenience of description, and the term may be replaced with any term, such as recommendation/expectation/prediction/next paging timer/duration/cycle/period/time/number of DRX. The base station or AMF starts the timer set with the received parameter value. The base station or AMF may not perform paging attempt/reattempt while the corresponding timer is operating.

When the UE in the RRC idle state or the RRC inactive state in association with the other USIM than the connected USIM attempts to perform a tracking area update or RNAU according to its movement or performs a connection setup procedure due to generation of mobile transmission data, the UE may pause/suspend/release/disregard/let pending the procedure. Identification information therefor may be received from the base station associated with the connected USIM and be configured in the UE. Or, the indication information may be included and transmitted when indicating a switch from the base station associated with the other USIM to the RRC idle state or the RRC inactive state through the RRC release message. The indication information may further include a timer/duration/period/cycle/time for pausing/suspending/releasing/letting pending the procedure.

Upon Determining to Switch the Connected USIM

Upon determining to switch, the UE may instruct/request the base station/AMF associated with the connected USIM to pause/suspend/release the connection/PDU session.

Upon receiving paging in association with the other USIM, the UE may instruct/request the base station/AMF associated with the connected USIM to pause/suspend/release the connection/PDU session to perform corresponding paging reception and/or following RRC connection setup procedure/service request procedure.

For example, the UE may instruct/request to pause/suspend/release the connection/PDU session through one of any uplink NAS messages (e.g., registration request message, service request message, control plane service request message, NAS transport message). The AMF may send an accept message or ack message for this to the UE. Alternatively, the AMF may not send an accept message or ack message. As another example, the UE may initiate a de-registration procedure. The UE may instruct the base station/AMF to pause/suspend/release the connection/PDU session through the UE-initiated DEREGISTRATION REQUEST message.

The AMF may transmit it to the base station. The downlink message through the interface between the base station and the AMF may include indication information therefor.

As another example, the UE may instruct to pause/suspend/release the connection/PDU session through one of any uplink RRC messages (e.g., RRC setup request message, UL Information transfer message, and UE assistance message). Information (e.g., cause) for indicating this may be included in the corresponding message. Alternatively, the UE may generate an MAC CE and transmit it. Alternatively, the UE may indicate it by specifying a specific LCID. As still another example, the UE may instruct to pause/suspend/release the connection/PDU session through a FailureInformation RRC message. Information for indicating this may be included in the corresponding message. Alternatively, the UE may generate an MAC CE and transmit it. Alternatively, the UE may indicate it by specifying and using a specific LCID.

The base station may transmit it to the AMF. The uplink message through the interface between the base station and the AMF may include indication information therefor.

In the above-described embodiments, each corresponding message/indication information may include indication information for recommending/restricting the next paging attempt by the base station. For example, information for indicating that a paging attempt is recommended/allowed for the UE may be included. For example, service/radio bearer/LCID/flow/QFI/PDU session information for which a paging attempt is recommended/allowed for the corresponding UE may be included. To this end, it may include one or more pieces of information about service type (voice)/radio bearer identification information/LCID/flow identification information/QFI/PDU session identification information recommended for a paging attempt for the corresponding UE. The network receiving the corresponding indication information may attempt paging when paging is started by the corresponding service (voice)/radio bearer/LCID/flow/QFI/PDU session for the corresponding UE. As another example, it may include indication information for restricting paging for the corresponding UE. Upon receiving the indication information, the network may not attempt paging in whatever occasion, for the UE. Or, upon receiving the indication information, the network may not attempt paging for the UE, except for emergency services. As further another example, the indication information for restricting the UE to perform paging may include a timer for restricting paging. For convenience of description, the timer is denoted as a back-off timer. This is merely for convenience of description, and the term may be replaced with any term, such as recommendation/expectation/prediction/next paging timer/duration/cycle/period/time/number of DRX. The base station or AMF starts the timer set with the received parameter value. It may be set not to perform a paging attempt/reattempt while the corresponding timer is operating.

The UE may transmit assistance information that may assist radio resource/network management, such as recommendation/permission/restriction on paging attempts of the base station/AMF. For example, the assistance information may include information for indicating that the service triggering the request is one of the MMTEL voice, MMTEL video, or SMS. As another example, the assistance information may include one or more pieces of information about radio bearer identification information/LCID/flow identification information/QFI/PDU session identification information to be recommended/allowed/restricted for a paging attempt. As further another example, the UE may transmit information for instructing to transmit a suspend request by paging from the base station associated with the other USIM. As still another example, the UE may transmit expected/anticipated suspend time/period/duration information. As yet another example, the UE may transmit time/period/duration information for restricting the (maximum) suspend time.

The UE may transmit the corresponding information to the base station through any signaling. For example, the signaling may be an RRC message. As another example, the corresponding signaling may be transmitted to the base station through the MAC CE.

Instruction to Process a Procedure Following the Paging Procedure after Suspended Upon receiving the suspend request information from the UE, the base station may pause/suspend/release the RRC connection. The base station may release the RRC connection or suspend the RRC connection through the RRC connection release procedure. The base station may transmit information for instructing the operation of the UE during or after the suspend process through the corresponding message. As an example, after switching to the RRC inactive state for the base station associated with the USIM, the UE may resume the paused/suspended procedure (or subsequent operations) for the base station associated with the other USIM. The procedure may be one of the following operations.

Instruct to resume from AS_A to AS_B

Instruct to resume from AS_A to upper layer (NAS_A)

When a paging message is received, transfer the UE identifier and access type to the upper layer (forward the ue-Identity and accessType (if present) to the upper layers;)

Initiate RRC connection resume procedure (or transmit RRC connection resume request message)

Initiate RRC connection setup procedure (or transmit RRC connection setup request message)

Initiate NAS procedure (e.g., service request procedure) (or transmit NAS message or transfer NAS message to lower layer)

Transmit RRC connection resume complete message

Transmit RRC connection setup complete message

Transmit any uplink signaling to the corresponding base station

For example, upon receiving the RRC connection release (RRC release) message from the base station, the UE receives an RRC release message having a suspend configuration in response to the RRC resume request message and stops the timer if the timer, which starts when the RRC resume request message is transmitted, is in operation.

The UE replaces the parameters (e.g., KgNB, KRRCint, C-RNTI, cellIdentity, physical cell identity) in the UE inactive AS context with the received value.

The UE suspends all SRB(s), except for SRB0, and DRB(s).

The UE indicates PDCP suspend to the lower layers of all the DRBs.

The UE announces the suspension of the RRC connection to the upper layer.

The UE enters the RRC inactive state and performs cell selection.

The UE instructs the AS associated with the other USIM to resume.

Identifier/index information for identifying AS/RRC associated with each USIM may be defined in the RRC information element. Thus, the base station and the UE may distinguish them.

The transmission/reception information for the above-described embodiment of data transmission/reception collision prevention may be included in the assistance information described with reference to FIGS. 10 and 11 or may be transmitted/received through additional signaling.

A UE configured with a plurality of USIMs may perform a smooth paging operation and prevent service interruption and occurrence of transmission/reception data collision according to the operation described above. A UE and a base station for performing all or any combination of the above-described embodiments will be described below.

Figure 12:
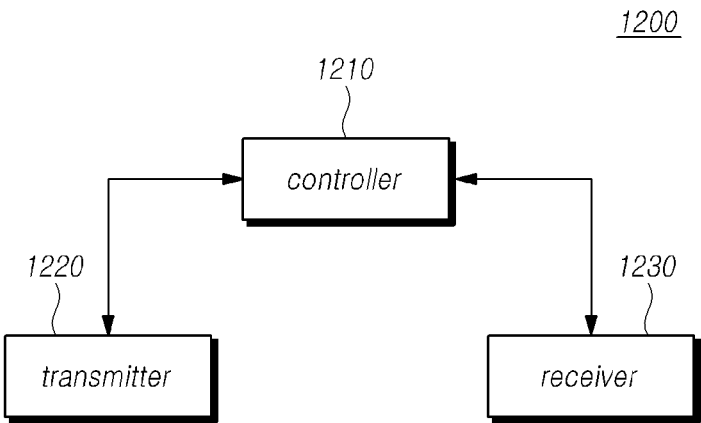
FIG. 12 is a block diagram illustrating a UE according to an embodiment.

FIG. 12 is a block diagram illustrating a UE according to an embodiment.

Referring to FIG. 12, a UE 1200 performing communication using a plurality of USIMs includes a controller 1210 for determining to release one or more networks in a connected state while in concurrent registration to one or more networks respectively associated with the plurality of USIMs and a transmitter 1220 for transmitting assistance information for instructing to release to a base station or a core network control plane entity.

The controller 1210 monitors a paging message based on the assistance information.

According to an embodiment, the UE performing communication using the plurality of USIMs may concurrently register to one or more networks associated with the plurality of USIMs. The controller 1210 may determine to release one or more networks associated with the plurality of USIMs according to certain conditions. For example, the controller 1210 may release the connection with the network associated with any one USIM according to a user input signal. Alternatively, the controller 1210 may determine to release the network associated with a specific USIM according to a priority or whether a preset condition is met.

The assistance information may be included and transmitted in a NAS transport message or a NAS deregistration message. Further, the assistance information may include information for limiting or allowing the transmission, by the base station or the core network control plane entity, of the paging message to the UE for a predetermined time preset.

According to an embodiment, the information for limiting or allowing paging message transmission may include at least one piece of i) information for instructing that only voice data be paged, ii) information for instructing paging restriction, iii) radio bearer information for limiting or allowing paging, iv) logical channel identification information (LCID), v) a flow identification number, vi) QoS flow ID (QFI) information, and vii) PDU session identification information.

Meanwhile, before the controller 1210 determines to release, the receiver 1230 may receive indication information indicating whether the transmission of assistance information is allowed from the base station or the core network control plane entity (e.g., AMF). The controller 1210 may transmit the assistance information only when the transmission of the assistance information is allowed by the indication information.

When transmission of a paging message is restricted based on the assistance information, the controller 1210 may monitor the paging message considering the restriction. Alternatively, when the transmission of the paging message is allowed based on the assistance information, the controller 1210 may monitor the paging message considering the corresponding matter.

Alternatively, the controller 1210 may monitor a paging message in a specific paging occasion or a paging frame determined based on the assistance information.

Meanwhile, the controller 1210 may not accept the paging message reception even when the paging message is identified as a result of monitoring the paging message. If the controller 1210 does not accept the reception of the paging message, the transmitter 1220 may transmit non-acceptance indication information about the paging message to the base station or the core network control plane entity.

Whether the controller 1210 accepts the reception of the paging message may be determined according to the cause of the paging. For example, the paging message may include paging cause information. The controller 1210 may determine whether to accept the reception of the paging message based on the paging cause information.

For example, the paging cause information may include information indicating voice data. For example, when the paging cause information indicates voice data, the controller 1210 may receive a paging message and, otherwise, may not accept reception.

In addition, the controller 1210 controls the overall operation of the UE 1200, necessary when the multi-USIM UE performs the paging operation, service interruption reduction and transmission/reception collision prevention operation, needed to perform the above-described embodiments.

Further, the transmitter 1220 and the receiver 1230 are used to transmit or receive signals or messages or data necessary for performing the above-described embodiments, with the base station or core network entity.

Figure 13:
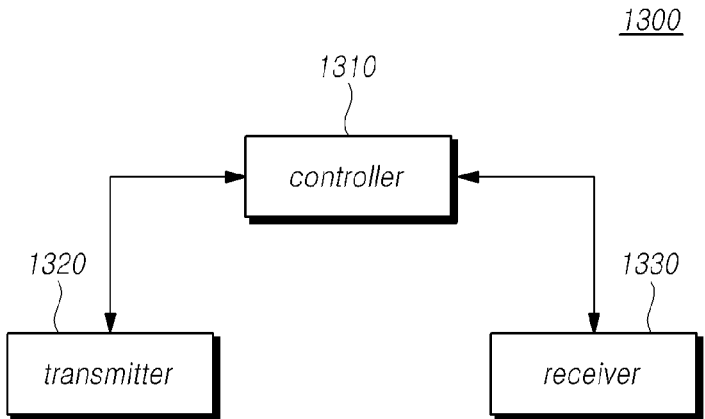
FIG. 13 is a block diagram illustrating a base station according to an embodiment.

FIG. 13 is a block diagram illustrating a base station according to an embodiment.

Referring to FIG. 13, a base station 1300 performing communication with a UE using a plurality of USIMs may include a receiver 1330 for receiving, from a core network control plane entity, assistance information for instructing to release connection, transmitted from a UE in concurrent registration to one or more networks associated with the plurality of USIMs and a controller 1310 for controlling transmission of a paging message to the UE based on the assistance information.

The UE performing communication using the plurality of USIMs may concurrently register to one or more networks associated with the plurality of USIMs. The UE may determine to release one or more networks associated with the plurality of USIMs according to certain conditions. For example, the UE may release the connection with the network associated with any one USIM according to a user input signal. Alternatively, the UE may determine to release the network associated with a specific USIM according to a priority or whether a preset condition is met.

The UE may transmit assistance information for instructing release to the base station or the core network control plane entity. When the UE transmits assistance information to the core network control plane entity, the receiver 1330 may receive the assistance information from the core network control plane entity. For example, the assistance information may be received through an interface (e.g., N2 interface) between the base station and the core network control plane entity.

According to an embodiment, the assistance information may be included in a NAS transport message or a NAS deregistration message which may then be received by the core network control plane entity. Further, the assistance information may include information for limiting or allowing the transmission, by the base station or the core network control plane entity, of the paging message to the UE for a predetermined time preset.

According to an embodiment, the information for limiting or allowing paging message transmission may include at least one piece of i) information for instructing that only voice data be paged, ii) information for instructing paging restriction, iii) radio bearer information for limiting or allowing paging, iv) logical channel identification information (LCID), v) a flow identification number, vi) QoS flow ID (QFI) information, and vii) PDU session identification information.

Meanwhile, before the UE determines to release, the base station or core network control plane entity (e.g., AMF) may transmit indication information indicating whether the transmission of assistance information by the UE is allowed. The UE may transmit the assistance information only when the transmission of the assistance information is allowed by the indication information.

The controller 1310 may determine whether to transmit a paging message to the UE based on the assistance information. When the transmission of the paging message is restricted by the assistance information, the controller 1310 controls the transmission of the paging message considering the restriction. Alternatively, the controller 1310 may control the paging message to be transmitted in a determined specific paging occasion or paging frame based on the assistance information.

When transmission of a paging message is restricted based on the assistance information, the UE may monitor the paging message considering the restriction. Alternatively, when the transmission of the paging message is allowed based on the assistance information, the UE may monitor the paging message considering the corresponding matter. Alternatively, the UE may monitor a paging message in a specific paging occasion or paging frame determined based on the assistance information.

Meanwhile, the UE may not accept the paging message reception even when the paging message is identified as a result of monitoring the paging message. If the UE does not accept the reception of the paging message, the UE may transmit non-acceptance indication information about the paging message to the base station or the core network control plane entity. The receiver 1330 may receive non-acceptance indication information.

Whether the UE accepts the reception of the paging message may be determined according to the cause of the paging. For example, the paging message may include paging cause information. The UE may determine whether to accept the reception of the paging message based on the paging cause information. To this end, the transmitter 1320 may include the paging cause information in the paging message and transmit it.

For example, the paging cause information may include information indicating voice data. For example, when the paging cause information indicates voice data, the UE may receive a paging message and, otherwise, may not accept reception.

In addition, the controller 1310 controls the overall operation of the base station 1300, necessary when the multi-USIM UE performs the paging operation, service interruption reduction and transmission/reception collision prevention operation, needed to perform the above-described embodiments.

Further, the transmitter 1320 and the receiver 1330 are used to transmit or receive signals or messages or data necessary for performing the above-described embodiments, with the UE or core network entity.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing communication using a plurality of universal subscriber identity modules (USIMs) by a user equipment (UE), the method comprising:
   transmitting a multi-USIM UE capability to a base station or a core network control plane entity;
   transmitting assistance information to the base station or the core network control plane entity; and
   monitoring a paging message based on the assistance information,
   wherein the assistance information includes both of i) first information for releasing a connected state for one or more networks and ii) second information for the base station or the core network control plane entity to restrict or allow transmission of the paging message for the UE, and
   wherein the assistance information is included and transmitted in a service request message.

2. The method of claim 1, further comprising, before transmitting the assistance information, receiving indication information for indicating whether to allow transmission of the assistance information from the base station or the core network control plane entity.

3. The method of claim 1, wherein the second information for restricting or allowing the transmission of the paging message includes at least one piece of information for instructing to paging only voice data, information for instructing to restrict all paging, and packet data unit (PDU) session identification information for allowing paging.

4. The method of claim 1, wherein the multi-USIM UE capability includes at least one of a connected state release capability, a paging restriction capability, a paging rejection capability, and a paging cause capability.

5. A method for performing communication with a user equipment (UE) using a plurality of universal subscriber identity modules (USIMs) by a base station, the method comprising:
   receiving a multi-USIM UE capability and assistance information from the UE or a core network control plane entity; and
   controlling transmission of a paging message for the UE based on the assistance information,
   wherein the single assistance information includes both of first information for releasing a connected state for one or more networks and second information for the base station or the core network control plane entity to restrict or allow transmission of the paging message for the UE, and
   wherein the assistance information is included and received in a service request message.

6. The method of claim 5, further comprising, before receiving the assistance information, transmitting indication information for indicating whether to allow transmission of the assistance information to the UE.

7. The method of claim 5, wherein the second information for restricting or allowing the transmission of the paging message includes at least one piece of information for instructing to paging only voice data, information for instructing to restrict all paging, and packet data unit (PDU) session identification information for allowing paging.

8. A user equipment (UE) performing communication using a plurality of universal subscriber identity modules (USIMs), comprising:
   a transmitter configured to transmit a multi-USIM UE capability to a base station or a core network control plane entity and transmitting assistance information to the base station or the core network control plane entity; and a controller configured to monitor a paging message based on the assistance information, wherein the assistance information includes both of first information for releasing a connected state for one or more networks and second information for the base station or the core network control plane entity to restrict or allow transmission of the paging message for the UE, and wherein the assistance information is included and transmitted in a service request message.

9. The UE of claim 8, further comprising a receiver configured to receive indication information for indicating whether to allow transmission of the assistance information from the base station or the core network control plane entity.

10. The UE of claim 8, wherein the second information for restricting or allowing the transmission of the paging message includes at least one piece of information for instructing to paging only voice data, information for instructing to restrict all paging, and packet data unit (PDU) session identification information for allowing paging.

11. The UE of claim 8, wherein the multi-USIM UE capability includes at least one of a connected state release capability, a paging restriction capability, a paging rejection capability, and a paging cause capability.

* * * * *